United States Patent
Kusashima et al.

(10) Patent No.: US 10,206,130 B2
(45) Date of Patent: Feb. 12, 2019

(54) TERMINAL DEVICE AND BASE STATION DEVICE

(71) Applicant: SHARP KABUSHIKI KAISHA, Sakai, Osaka (JP)

(72) Inventors: Naoki Kusashima, Sakai (JP); Kazuyuki Shimezawa, Sakai (JP); Wataru Ouchi, Sakai (JP); Toshizo Nogami, Sakai (JP); Alvaro Ruiz Delgado, Sakai (JP); Kimihiko Imamura, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 149 days.

(21) Appl. No.: 15/119,600

(22) PCT Filed: Mar. 20, 2015

(86) PCT No.: PCT/JP2015/058495
§ 371 (c)(1),
(2) Date: Aug. 17, 2016

(87) PCT Pub. No.: WO2015/141833
PCT Pub. Date: Sep. 24, 2015

(65) Prior Publication Data
US 2017/0064571 A1 Mar. 2, 2017

(30) Foreign Application Priority Data
Mar. 20, 2014 (JP) .................. 2014-058190

(51) Int. Cl.
*H04L 5/00* (2006.01)
*H04W 24/10* (2009.01)
(Continued)

(52) U.S. Cl.
CPC ........... *H04W 24/08* (2013.01); *H04W 24/10* (2013.01); *H04W 48/16* (2013.01); *H04L 5/0048* (2013.01); *H04L 5/0073* (2013.01)

(58) Field of Classification Search
CPC ..... H04W 24/08; H04W 24/10; H04W 48/16; H04L 5/0048; H04L 5/0073; H04L 5/00
See application file for complete search history.

(56) References Cited

U.S. PATENT DOCUMENTS 9,893,853 B2 * 2/2018 Yi .................. H04L 5/0048
9,907,066 B2 * 2/2018 Park ................ H04W 72/042
(Continued)

FOREIGN PATENT DOCUMENTS

EP 2670187 A1 12/2013
WO WO 2014/007556 A1 1/2014

OTHER PUBLICATIONS

"Discovery design options", 3GPP TSG RAN WG1 Meeting #76, Prague, Czech Republic, Feb. 10-14, 2014, R1-140039.
(Continued)

*Primary Examiner* — Tri H Phan
(74) *Attorney, Agent, or Firm* — Birch, Stewart, Kolasch & Birch, LLP

(57) ABSTRACT

A terminal device communicating with a base station device includes a reception unit which performs first measurement based on a first RS and performs second measurement based on a second RS; and a higher layer processing unit which reports a first measurement result obtained by the first measurement and a second measurement result obtained by the second measurement to the base station device. The first measurement is performed in a first state. The first measurement or the second measurement is performed in a second state.

7 Claims, 13 Drawing Sheets

(51) Int. Cl.
*H04W 24/08* (2009.01)
*H04W 48/16* (2009.01)

(56) References Cited

U.S. PATENT DOCUMENTS

| | | | | |
|---|---|---|---|---|
| 2012/0213109 | A1* | 8/2012 | Xu | H04B 7/024 370/252 |
| 2014/0112194 | A1* | 4/2014 | Novlan | H04W 48/16 370/254 |
| 2014/0302856 | A1* | 10/2014 | Nory | H04W 48/10 455/437 |
| 2015/0004969 | A1* | 1/2015 | Han | H04W 52/0251 455/434 |
| 2015/0092768 | A1* | 4/2015 | Ng | H04W 48/16 370/350 |
| 2015/0163729 | A1 | 6/2015 | Seo et al. | |
| 2015/0222402 | A1* | 8/2015 | Ouchi | H04L 1/00 370/329 |
| 2015/0327097 | A1* | 11/2015 | Chai | H04W 24/10 370/252 |
| 2016/0050617 | A1* | 2/2016 | Hwang | H04L 5/001 455/434 |
| 2016/0066281 | A1* | 3/2016 | Ouchi | H04W 52/04 370/280 |
| 2016/0255609 | A1* | 9/2016 | Kim | H04J 13/16 370/203 |
| 2016/0301515 | A1* | 10/2016 | Ouchi | H04L 5/0057 |
| 2016/0337952 | A1* | 11/2016 | Li | H04W 48/16 |
| 2017/0064576 | A1* | 3/2017 | Kusashima | H04W 48/16 |
| 2017/0078903 | A1* | 3/2017 | Kusashima | H04W 24/10 |

OTHER PUBLICATIONS

"Resource Allocation and UE Behavior for Discovery Type 1 and Type 2", 3GPP TSG RAN WG1 Meeting #74, Barcelona, Spain, Aug. 19-23, 2013, R1-133388.

"3rd Generation Partnership Project; Technical Specification Group Radio Access Network; Small cell enhancements for E-UTRA and E-UTRAN-Physical layer aspects (Release 12)", Technical Report, 3GPP TR 36.872 V12.1.0, Dec. 2013, 100 pages.

"LTE; Evolved Universal Terrestrial Radio Access (E-UTRA); Physical Channels and Modulation", Technical Specification, 3GPP TS 36.211 V11.5.0, Jan. 2014, 122 pages.

CMCC, "Enhancement of Small Cell operation efficiency", 3GPP TSG RAN WG1 Meeting #75, R1-135634, San Francisco, US, Nov. 11-15, 2013, 4 pages.

* cited by examiner

FIG. 12

| DRS configuration | (k',l') | ns mod 2 |
|---|---|---|
| 0 | (9,5) | 0 |
| 1 | (11,2) | 1 |
| 2 | (9,2) | 1 |
| 3 | (7,2) | 1 |
| 4 | (9,5) | 1 |
| 5 | (8,5) | 0 |
| 6 | (10,2) | 1 |
| 7 | (8,2) | 1 |
| 8 | (6,2) | 1 |
| 9 | (8,5) | 1 |
| 10 | (3,5) | 0 |
| 11 | (2,5) | 0 |
| 12 | (5,2) | 1 |
| 13 | (4,2) | 1 |
| 14 | (3,2) | 1 |
| 15 | (2,2) | 1 |
| 16 | (1,2) | 1 |
| 17 | (0,2) | 1 |
| 18 | (3,5) | 1 |
| 19 | (2,5) | 1 |
| 20 | (11,1) | 1 |
| 21 | (9,1) | 1 |
| 22 | (7,1) | 1 |
| 23 | (10,1) | 1 |
| 24 | (8,1) | 1 |
| 25 | (6,1) | 1 |
| 26 | (5,1) | 1 |
| 27 | (4,1) | 1 |
| 28 | (3,1) | 1 |
| 29 | (2,1) | 1 |
| 30 | (1,1) | 1 |
| 31 | (0,1) | 1 |

TERMINAL DEVICE AND BASE STATION DEVICE

TECHNICAL FIELD

The present invention relates to a terminal device and a base station device.

This application claims priority based on Japanese Patent Application No. 2014-058190 filed in Japan on Mar. 20, 2014, the content of which is incorporated herein.

BACKGROUND ART

A radio access scheme and a radio network of cellular mobile communication (hereinafter, referred to as "Long Term Evolution (LTE)" or "Evolved Universal Terrestrial Radio Access: EUTRA") have been studied in the 3rd Generation Partnership Project (3GPP). In the LTE, a base station device (base station) is also referred to as an eNodeB (evolved NodeB) and a terminal device (mobile station, mobile station device, terminal) is also referred to as UE (User Equipment). The LTE is a cellular communication system in which a plurality of areas covered by base station devices are arranged in a cell-like shape. A single base station device may manage a plurality of cells.

The LTE is ready for Frequency Division Duplex (FDD) and Time Division Duplex (TDD). The LTE employing a FDD scheme is also referred to as FD-LTE or LTE FDD. The TDD is a technique that allows full-duplex communication in at least two frequency bands by performing frequency-division multiplexing of an uplink signal and a downlink signal. The LTE employing a TDD scheme is also referred to as TD-LTE or LTE TDD. The TDD is a technique that allows full-duplex communication in a single frequency band by performing time-division multiplexing of an uplink signal and a downlink signal. Details of the FD-LTE and the TD-LTE are disclosed in NPL 1.

A base station device is able to transmit, to a terminal device, a reference signal (also referred to as RS) which is a known signal between the base station device and the terminal device. A plurality of reference signals may be transmitted for various purposes such as demodulation of a signal and a channel and reporting of a channel state. For example, a cell-specific reference signal is transmitted in all downlink subframes as a reference signal specific to a cell. In addition, for example, a terminal-specific reference signal is transmitted as a reference signal specific to a terminal device in a resource in which a data signal to the terminal device is mapped. Details of the reference signals are disclosed in NPL 1.

In the 3GPP, introduction of a small cell has been studied. A small cell is a collective term indicating a cell in which transmit power of a base station device forming the cell is small and which has smaller coverage than that of a conventional cell (macro cell). For example, when small cells are applied with a high frequency band, it is possible to arrange the small cells at high density and an effect of improving spectral efficiency per area is achieved. In the study of introduction of a small cell, discussion on a technique of switching the base station device to a stop state for various purposes such as reduction in power consumption and reduction in inter-cell interference has been carried out. Details thereof are disclosed in NPL 2.

CITATION LIST

Non Patent Literature

NPL 1: 3rd Generation Partnership Project; Technical Specification Group Radio Access Network; Evolved Universal Terrestrial Radio Access (E-UTRA); Physical Channels and Modulation (Release 11), 3GPP TS 36.211 V11.5.0 (2014-01).

NPL 2: 3rd Generation Partnership Project; Technical Specification Group Radio Access Network; Small cell enhancements for E-UTRA and E-UTRAN-Physical layer aspects (Release 12), 3GPP TR 36.872 V12.1.0 (2013-12).

SUMMARY OF INVENTION

Technical Problem

However, when the base station device is switched to the stop state, transmission of a synchronization signal and a reference signal is also stopped. Therefore, it is difficult for a terminal device to find the base station device in the stop state. In such a situation, it takes a long time for preparation for connecting the terminal device to the base station device in the stop state, which causes great deterioration in transmission efficiency.

The invention has been made in view of the aforementioned problem and an object thereof is to provide a base station device, a terminal device, a communication system, a communication method, and an integrated circuit which are able to improve transmission efficiency in a communication system in which the base station device communicates with the terminal device.

Solution to Problem (1) In order to achieve the aforementioned object, the invention takes following means. That is, a terminal device of an embodiment of the invention includes a reception unit which receives information applied to measurement of a discovery signal, in which the information includes information about a physical cell identity, a parameter different from the physical cell identity, and a subframe, and information about a resource configuration.

(2) Moreover, in the terminal device of another embodiment of the invention, a signal sequence of the discovery signal is defined based on the parameter different from the physical cell identity.

(3) Moreover, in the terminal device of another embodiment of the invention, the information about the resource configuration is an index for specifying a resource element of the discovery signal.

(4) A base station device of another embodiment of the invention includes a transmission unit which transmits information applied to measurement of a discovery signal, in which the information includes information about a physical cell identity, a parameter different from the physical cell identity, and a subframe, and information about a resource configuration.

(5) Moreover, in the base station device of another embodiment of the invention, a signal sequence of the discovery signal is defined based on the parameter different from the physical cell identity.

(6) Moreover, in the base station device of another embodiment of the invention, the information about the resource configuration is an index for specifying a resource element of the discovery signal.

(7) A communication method of a terminal device of another embodiment of the invention includes a step of transmitting information applied to measurement of a discovery signal, in which the information includes information about a physical cell identity, a parameter different from the physical cell identity, and a subframe, and information about a resource configuration.

(8) Moreover, a communication method of a base station device of another embodiment of the invention includes a step of transmitting information applied to measurement of a discovery signal, in which the information includes information about a physical cell identity, a parameter different from the physical cell identity, and a subframe, and information about a resource configuration.

(9) Moreover, an integrated circuit mounted in a terminal device of another embodiment of the invention includes a function of receiving information applied to measurement of a discovery signal, in which the information includes information about a physical cell identity, a parameter different from the physical cell identity, and a subframe, and information about a resource configuration.

(10) Moreover, an integrated circuit mounted in a base station device of another embodiment of the invention includes a function of transmitting information applied to measurement of a discovery signal, in which the information includes information about a physical cell identity, a parameter different from the physical cell identity, and a subframe, and information about a resource configuration.

(11) Moreover, in the base station device of another embodiment of the invention, a first state may be a state where information about second measurement is not configured to the terminal device and a second state may be a state where information about the second measurement is configured to the terminal device.

(12) Moreover, in the base station device of another embodiment of the invention, the second state may be a state where a first RS is not transmitted.

Advantageous Effects of Invention

According to the invention, it is possible to improve transmission efficiency in communication of a base station device, communication of a terminal device, and a radio communication system in which the base station device communicates with the terminal device.

BRIEF DESCRIPTION OF DRAWINGS

FIG. 12 illustrates one example of designation of a resource element to a configuration of the DRS.

DESCRIPTION OF EMBODIMENTS

Figure 1:
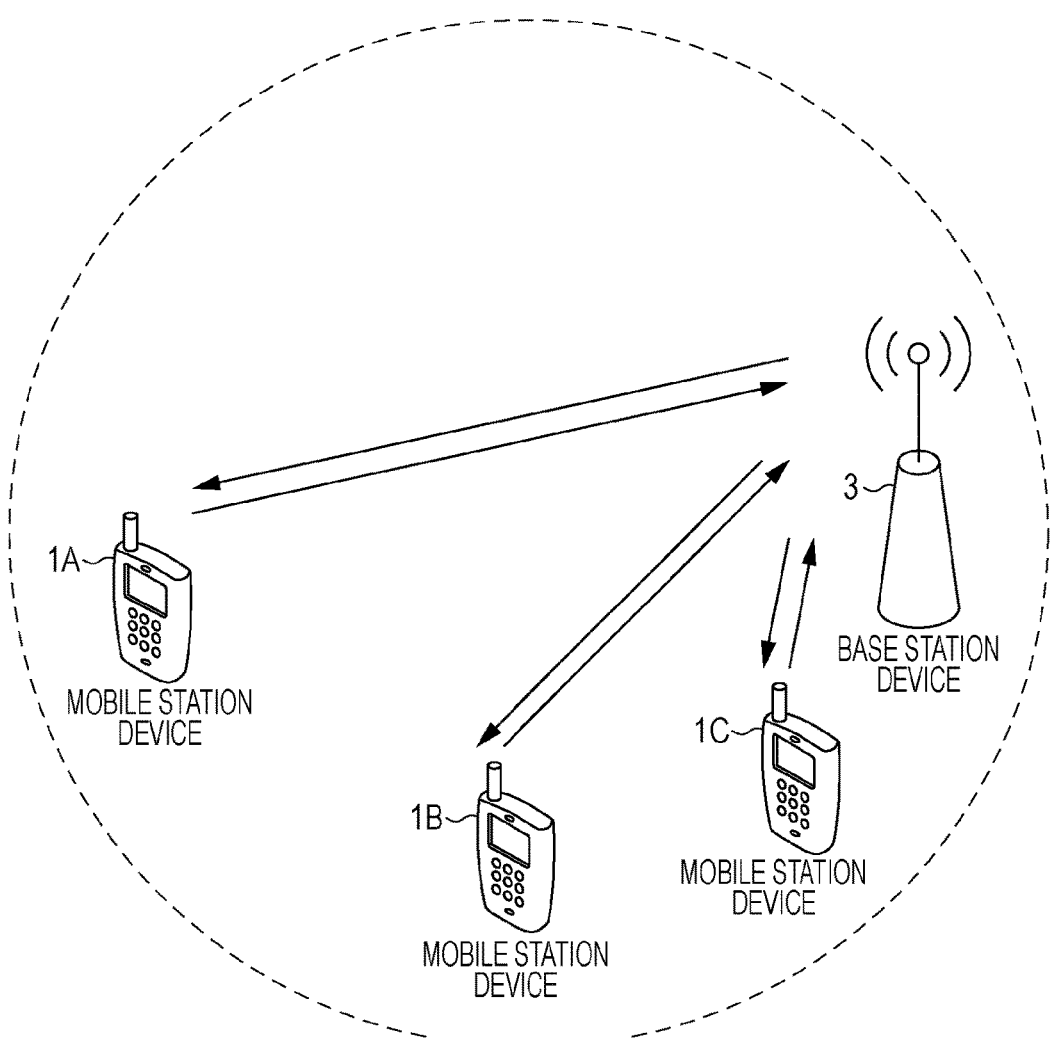
FIG. 1 is a conceptual view of a radio communication system of the present embodiment.

Description will hereinafter be given in detail for embodiments of the invention.

In the present embodiment, a plurality of cells are configured to a terminal device. A technique in which the terminal device performs communication through a plurality of cells is referred to as cell aggregation, carrier aggregation, or dual connectivity. The invention may be applied to each of the plurality of cells configured to the terminal device. The invention may be applied to a part of the plurality of configured cells. Cells configured to the terminal device are also referred to as serving cells.

In the carrier aggregation, a plurality of serving cells which are configured include one primary cell (PCell) and one or more secondary cells (SCell). The primary cell is a serving cell in which initial connection establishment procedure is performed, a serving cell in which connection re-establishment procedure is started, or a cell which is instructed as a primary cell in handover procedure. The secondary cells may be configured at a time when or after RRC connection is established.

The dual connectivity is an operation in which radio resources provided by at least two different network points (a master base station device and a secondary base station device) which are connected by non-ideal backhaul are consumed by a predetermined terminal device in an RRC connected (RRC_CONNECTED) state.

In the dual connectivity, a base station device that is connected to at least S1-MME (Mobility Management Entity) and functions as a mobility anchor of a core network is referred to as a master base station device (Master eNB). A base station device that provides a terminal device with an additional radio resource and is not the master base station device is referred to as a secondary base station device. A group of serving cells related to the master base station device is referred to as a Master Cell Group and a group of serving cells related to the secondary base station device is referred to as a Secondary Cell Group.

A FDD (Frequency Division Duplex) or TDD (Time Division Duplex) scheme is applied to a radio communication system of the present embodiment. In the case of the cell aggregation, the TDD scheme may be applied to all of a plurality of cells. Moreover, in the case of the cell aggregation, cells to which the TDD scheme is applied and cells to which the FDD scheme is applied may be aggregated. When the cells to which the TDD is applied and the cells to which the FDD is applied are aggregated, the invention is able to be applied to the cells to which the TDD is applied.

When the plurality of cells to which the TDD is applied are aggregated, a half-duplex TDD scheme or a full-duplex TDD scheme is able to be applied.

A terminal device transmits, to a base station device, information indicating combinations of bands supporting the carrier aggregation by the terminal device. The terminal device transmits, to the base station device, information for specifying whether or not each of the combinations of bands supports simultaneous transmission and reception in the plurality of serving cells in a plurality of different bands.

In the present embodiment, "X/Y" includes meaning of "X or Y". In the present embodiment, "X/Y" includes meaning of "X and Y". In the present embodiment, "X/Y" includes meaning of "X and/or Y".

FIG. 1 is a conceptual view of the radio communication system of the present embodiment. In FIG. 1, the radio communication system includes terminal devices 1A to 1C and a base station device 3. The terminal devices 1A to 1C are referred to as a terminal device 1 below.

A physical channel and a physical signal of the present embodiment will be described.

In FIG. 1, an uplink physical channel is used in uplink radio communication from the terminal device 1 to the base station device 3. The uplink physical channel is able to be used to transmit information output from a higher layer. The uplink physical channel includes PUCCH (Physical Uplink Control Channel), PUSCH (Physical Uplink Shared Channel), PRACH (Physical Random Access Channel), and the like.

The PUCCH is a physical channel used to transmit uplink control information (UCI). The uplink control information includes downlink channel state information (CSI), a scheduling request (SR) indicating a request of a PUSCH resource, and ACK (acknowledgement)/NACK (negative-acknowledgement) to downlink data (Transport block, Downlink-Shared Channel: DL-SCH). The ACK/NACK is also referred to as HARQ-ACK, HARQ feedback, or response information.

The PUSCH is a physical channel used to transmit uplink data (Uplink-Shared Channel: UL-SCH). Further, the PUSCH may be used to transmit HARQ-ACK and/or channel state information together with the uplink data. The PUSCH may be used to transmit only channel state information or only HARQ-ACK and channel state information.

The PRACH is a physical channel used to transmit a random access preamble. A main purpose of the PRACH is to allow the terminal device 1 to acquire synchronization with the base station device 3 in a time domain. In addition, the PRACH is also used for initial connection establishment procedure, handover procedure, connection re-establishment procedure, synchronization for uplink transmission (timing adjustment), and a request for PUSCH resources.

In FIG. 1, an uplink physical signal is used in the uplink radio communication. The uplink physical signal includes an uplink reference signal (UL RS) and the like. For the uplink reference signal, a DMRS (Demodulation Reference Signal), an SRS (Sounding Reference Signal), and the like are used. The DMRS is associated with transmission of the PUSCH or the PUCCH. The DMRS is time-multiplexed with the PUSCH or the PUCCH. The base station device 3 uses the DMRS to perform channel correction of the PUSCH or the PUCCH. Hereinafter, simultaneous transmission of the PUSCH and the DMRS is simply referred to as transmission of the PUSCH. Hereinafter, simultaneous transmission of the PUCCH and the DMRS is simply referred to as transmission of the PUCCH. Note that, the DMRS of uplink is also referred to as UL-DMRS. The SRS is not associated with transmission of the PUSCH or the PUCCH. The base station device 3 uses the SRS to measure a channel state of uplink.

In FIG. 1, a downlink physical channel is used in downlink radio communication from the base station device 3 to the terminal device 1. The downlink physical channel is able to be used to transmit information output from a higher layer. The downlink physical channel includes PBCH (Physical Broadcast Channel), PCFICH (Physical Control Format Indicator Channel), PHICH (Physical Hybrid automatic repeat request Indicator Channel), PDCCH (Physical Downlink Control Channel), EPDCCH (Enhanced Physical Downlink Control Channel), PDSCH (Physical Downlink Shared Channel), PMCH (Physical Multicast Channel), and the like.

The PBCH is used to broadcast a master information block (MIB, Broadcast Channel: BCH) which is shared by the terminal device 1. The MIB is able to be updated at an interval of 40 ms. The PBCH is repeatedly transmitted with a period of 10 ms. Specifically, initial transmission of the MIB is performed in a subframe 0 of a radio frame satisfying SFN mod 4=0 and retransmission (repetition) of the MIB is performed in subframes 0 of all other radio frames. The SFN (system frame number) is a number of a radio frame. The MIB is system information. For example, the MIB includes information indicating the SFN.

The PCFICH is used to transmit information for instructing a domain (OFDM symbol) used for transmission of the PDCCH.

The PHICH is used to transmit a HARQ indicator (HARQ feedback, response information) indicating ACK (ACKnowledgement) or NACK (Negative ACKnowledgement) to uplink data (Uplink Shared Channel: UL-SCH) received by the base station device 3. For example, when the terminal device 1 receives a HARQ indicator indicating ACK, corresponding uplink data is not retransmitted. For example, when the terminal device 1 receives a HARQ indicator indicating NACK, corresponding uplink data is retransmitted. A single PHICH transmits a HARQ indicator for single uplink data. The base station device 3 transmits HARQ indicators for a plurality of pieces of uplink data contained in the same PUSCH by using a plurality of PHICHs.

The PDCCH and the EPDCCH are used to transmit downlink control information (DCI). The downlink control information is also referred to as a DCI format. The downlink control information includes a downlink grant and an uplink grant. The downlink grant is also referred to as downlink assignment or downlink allocation.

The downlink grant is used for scheduling of a single PDSCH within a single cell. The downlink grant is used for scheduling of the PDSCH within a subframe that is the same as the subframe in which the downlink grant is transmitted. The uplink grant is used for scheduling of a single PUSCH within a single cell. The uplink grant is used for scheduling of a single PUSCH within the fourth or later subframe after the subframe in which the uplink grant is transmitted.

CRC (Cyclic Redundancy Check) parity bit is added to the DCI format. The CRC parity bit is scrambled by C-RNTI (Cell-Radio Network Temporary Identifier) or SPS C-RNTI (Semi Persistent Scheduling Cell-Radio Network Temporary Identifier). The C-RNTI and the SPS C-RNTI are identifiers for identifying a terminal device in a cell. The C-RNTI is used to control the PDSCH or the PUSCH in a single subframe. The SPS C-RNTI is used to allocate a resource of the PDSCH or the PUSCH periodically.

The PDSCH is used to transmit downlink data (Downlink Shared Channel: DL-SCH).

The PMCH is used to transmit multicast data (Multicast Channel: MCH).

In FIG. 1, following downlink physical signals are used in downlink radio communication. The downlink physical signals include a synchronization signal (SS), a downlink reference signal (DL RS), and the like.

The synchronization signal is used for the terminal device 1 to be synchronized in a frequency domain and a time domain of downlink. The synchronization signal is arranged in a predetermined subframe within a radio frame. For example, in the TDD scheme, the synchronization signal is arranged in subframes 0, 1, 5, and 6 within the radio frame.

In the FDD scheme, the synchronization signal is arranged in subframes 0 and 5 within the radio frame.

The downlink reference signal is used for the terminal device 1 to perform channel correction of the downlink physical channel. The downlink reference signal is used for the terminal device 1 to calculate downlink channel state information. The downlink reference signal is used for the terminal device 1 to measure a physical position of the terminal device 1.

The downlink reference signal includes CRS (Cell-specific Reference Signal), URS (UE-specific Reference Signal) associated with the PDSCH, DMRS (Demodulation Reference Signal) associated with the EPDCCH, NZP CSI-RS (Non-Zero Power Channel State Information-Reference Signal), ZP CSI-RS (Zero Power Channel State Information-Reference Signal), CSI-IM (Channel State Information-Interference Measurement), MBSFN RS (Multimedia Broadcast and Multicast Service over Single Frequency Network Reference signal), PRS (Positioning Reference Signal), NCT CRS (New Carrier Type Cell-specific Reference Signal), DRS (Discovery Reference Signal, Discovery Signal), and the like.

The CRS is transmitted in an entire band of a subframe. The CRS is used to perform demodulation of the PBCH/PDCCH/PHICH/PCFICH/PDSCH. The CRS may be used for the terminal device 1 to calculate downlink channel state information. The PBCH/PDCCH/PHICH/PCFICH is transmitted by an antenna port used for transmission of the CRS.

The URS associated with the PDSCH is transmitted in a subframe or band used for transmission of the PDSCH associated with the URS. The URS is used to perform demodulation of the PDSCH associated with the URS.

The PDSCH is transmitted by an antenna port used for transmission of the CRS or the URS. A DCI format 1A is used for scheduling of the PDSCH transmitted by an antenna port used for transmission of the CRS. A DCI format 2D is used for scheduling of the PDSCH transmitted by an antenna port used for transmission of the URS.

The DMRS associated with the EPDCCH is transmitted in a subframe or band used for transmission of the EPDCCH associated with the DMRS. The DMRS is used to perform demodulation of the EPDCCH associated with the DMRS. The EPDCCH is transmitted by an antenna port used for transmission of the DMRS.

The NZP CSI-RS is transmitted in a configured subframe. A resource in which the NZP CSI-RS is transmitted is configured by the base station device. The NZP CSI-RS is used for the terminal device 1 to calculate downlink channel state information. The terminal device 1 performs signal measurement (channel measurement) by using the NZP CSI-RS.

The resource of the ZP CSI-RS is configured by the base station device 3. The base station device 3 transmits the ZP CSI-RS with zero power. That is, the base station device 3 does not transmit the ZP CSI-RS. The base station device 3 does not transmit the PDSCH or the EPDCCH in the configured resource of the ZP CSI-RS.

The resource of the CSI-IM is configured by the base station device 3. The resource of the CSI-IM is configured to overlap with a part of the resource of the ZP CSI-RS. That is, the resource of the CSI-IM has characteristics equivalent to those of the ZP CSI-RS, and the base station device 3 performs transmission with zero power in the resource configured as the CSI-IM. That is, the base station device 3 does not transmit the CSI-IM. The base station device 3 does not transmit the PDSCH or the EPDCCH in the configured resource of the CSI-IM. In the resource corresponding to the NZP CSI-RS in a certain cell, the terminal device 1 is able to measure interference in the resource configured as the CSI-IM.

The MBSFN RS is transmitted in an entire band of a subframe used for transmission of the PMCH. The MBSFN RS is used to perform demodulation of the PMCH. The PMCH is transmitted by an antenna port used for transmission of the MBSFN RS.

The PRS is used for the terminal device to measure a physical position of the terminal device.

The NCT CRS (TRS) is able to be mapped to a predetermined subframe. For example, the NCT CRS is mapped to subframes 0 and 5. The NCT CRS may have a configuration partially similar to that of the CRS. For example, in each resource block, a position of a resource element to which the NCT CRS is mapped may be the same as a position of a resource element to which the CRS of an antenna port 0 is mapped. A sequence (value) used for the NCT CRS is able to be determined based on information configured through the PBCH, the PDCCH, the EPDCCH, or the PDSCH (RRC signaling). A sequence (value) used for the NCT CRS is able to be determined based on a parameter such as a cell ID (for example, a physical layer cell identity) or a slot number. A sequence (value) used for the NCT CRS is able to be determined by a method (scheme) different from the sequence (value) used for the CRS of the antenna port 0.

A downlink physical channel and a downlink physical signal are collectively referred to as a downlink signal. An uplink physical channel and an uplink physical signal are collectively referred to as an uplink signal. A downlink physical channel and an uplink physical channel are collectively referred to as a physical channel. A downlink physical signal and an uplink physical signal are collectively referred to as a physical signal.

The BCH, the MCH, the UL-SCH, and the DL-SCH are transport channels. A channel used in a medium access control (MAC) layer is referred to as a transport channel. A unit of the transport channel used in the MAC layer is also referred to as a transport block (TB) or a MAC PDU (Protocol Data Unit). Control of HARQ (Hybrid Automatic Repeat reQuest) is performed for each transport block in the MAC layer. The transport block is a unit of data delivered to the physical layer from the MAC layer. In the physical layer, the transport block is mapped to a code word and coding processing is performed for each code word.

As a method of signaling (notification, broadcasting) of control information from the base station device 3 to the terminal device 1, PDCCH signaling which is signaling through the PDCCH, RRC signaling which is signaling through an RRC layer, MAC signaling which is signaling through the MAC layer, or the like is used. Moreover, as the RRC signaling, dedicated RRC signaling for notifying control information specific to the terminal device 1 and common RRC signaling for notifying control information specific to the base station device 3 are used. Note that, in the following description, when simply described as RRC signaling, the RRC signaling means the dedicated RRC signaling and/or the common RRC signaling.

A configuration of a radio frame of the present embodiment will be described below.

Figure 2:
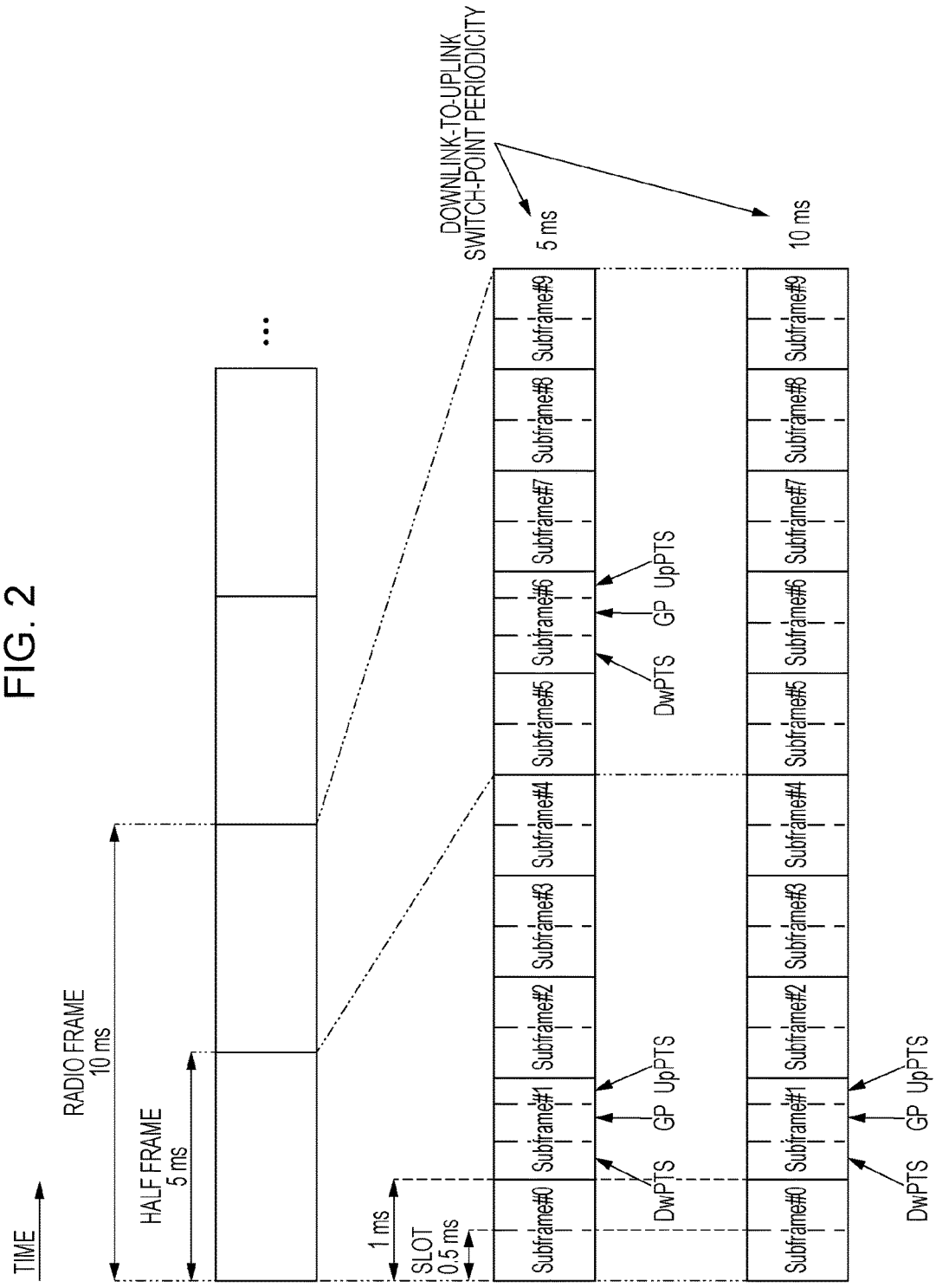
FIG. 2 illustrates a schematic configuration of a radio frame of the present embodiment.

FIG. 2 illustrates a schematic configuration of a radio frame of the present embodiment. Each of radio frames has a 10 ms length. In FIG. 2, a horizontal axis denotes a time axis. Each of the radio frames is constituted by two half frames. Each of the half frames has a 5 ms length. Each of the half frames is constituted by five subframes. Each of the subframes has a 1 ms length and is defined by two continuous slots. Each of the slots has a 0.5 ms length. The i-th subframe in a radio frame is constituted by the (2xi)-th slot and the (2xi+1)-th slot. That is, ten subframes are able to be used in each 10 ms period.

The subframe includes a downlink subframe (first subframe), an uplink subframe (second subframe), a special subframe (third subframe), and the like.

The downlink subframe is a subframe reserved for downlink transmission. The uplink subframe is a subframe reserved for uplink transmission. The special subframe is constituted by three fields. The three fields are a DwPTS (Downlink Pilot Time Slot), a GP (Guard Period), and an UpPTS (Uplink Pilot Time Slot). A total length of the DwPTS, the GP, and the UpPTS is 1 ms. The DwPTS is a field reserved for downlink transmission. The UpPTS is a field reserved for uplink transmission. The GP is a field in which downlink transmission or uplink transmission is not performed. Note that, the special subframe may be constituted by only the DwPTS and the GP or may be constituted by only the GP and the UpPTS.

A single radio frame is constituted by at least a downlink subframe, an uplink subframe, and a special subframe.

The radio communication system of the present embodiment supports downlink-to-uplink switch-point periodicities of 5 ms and 10 ms. When the downlink-to-uplink switch-point periodicity is 5 ms, each of half frames in the radio frame includes a special subframe. When the downlink-to-uplink switch-point periodicity is 10 ms, only the first half frame in the radio frame includes a special subframe.

A configuration of a slot of the present embodiment will be described below.

Figure 3:
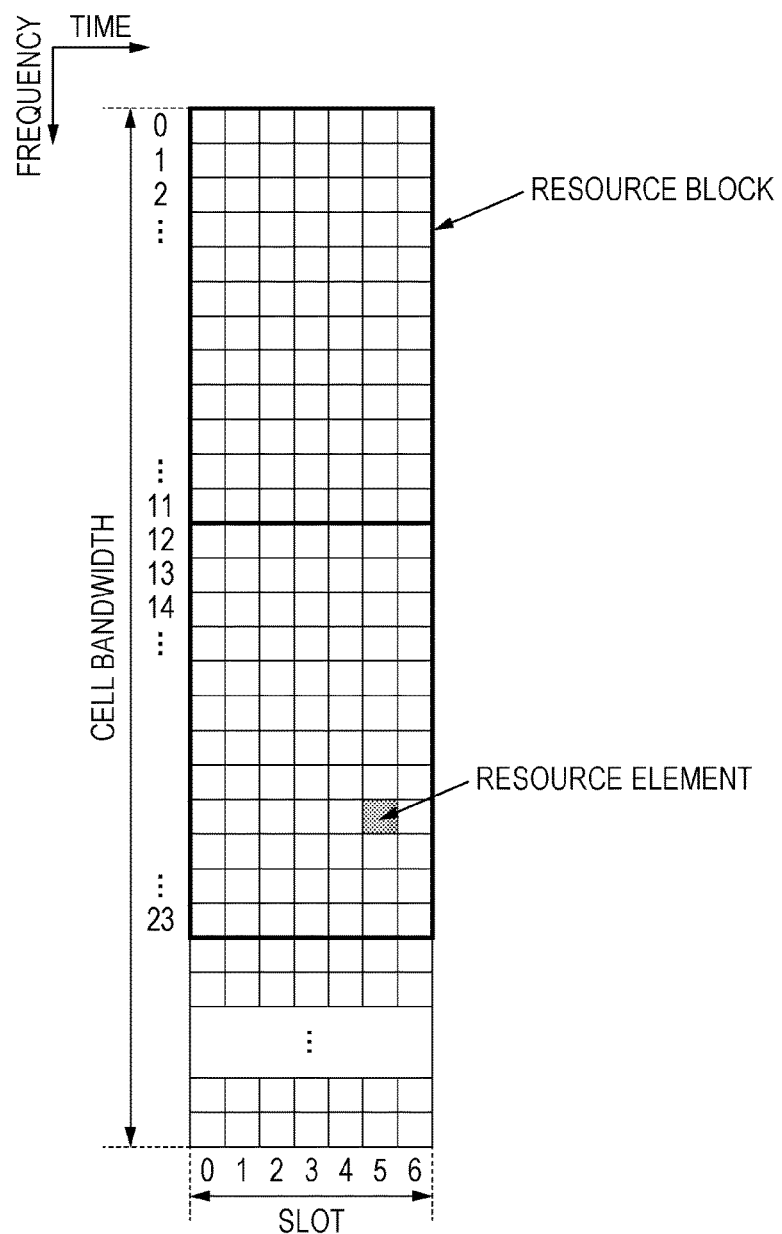
FIG. 3 illustrates a configuration of a slot of the present embodiment.

FIG. 3 illustrates a configuration of a slot of the present embodiment. In the present embodiment, normal CP (Cyclic Prefix) is applied to an OFDM symbol. Note that, extended CP (Cyclic Prefix) may be applied to the OFDM symbol. A physical signal or a physical channel transmitted in each of the slots is represented by a resource grid. The resource grid in downlink is defined by a plurality of subcarriers in a frequency direction and a plurality of OFDM symbols in a time direction. The resource grid in uplink is defined by a plurality of subcarriers in the frequency direction and a plurality of SC-FDMA symbols in the time direction. The number of subcarriers or resource blocks depends on a bandwidth of a cell. The number of OFDM symbols or SC-FDMA symbols forming one slot is seven in the case of the normal CP and six in the case of the extended CP. Each element in the resource grid is referred to as a resource element. The resource element is identified with use of a subcarrier number and an OFDM symbol or SC-FDMA symbol number.

The resource block is used for mapping to a resource element of a certain physical channel (such as the PDSCH or the PUSCH). In the resource block, a virtual resource block and a physical resource block are defined. A certain physical channel is firstly mapped to a virtual resource block. Then, the virtual resource block is mapped to a physical resource block. One physical resource block is defined by seven continuous OFDM symbols or SC-FDMA symbols in a time domain and twelve contiguous subcarriers in a frequency domain. Consequently, one physical resource block is constituted by (7×12) resource elements. One physical resource block corresponds to one slot in the time domain and corresponds to 180 kHz in the frequency domain. Physical resource blocks are numbered starting from 0 in the frequency domain. In addition, two resource blocks in one subframe, to which the same physical resource block number corresponds, are defined as a physical resource block pair (PRB pair, RB pair).

A physical channel and a physical signal transmitted in each of the subframes will be described below.

Figure 4:
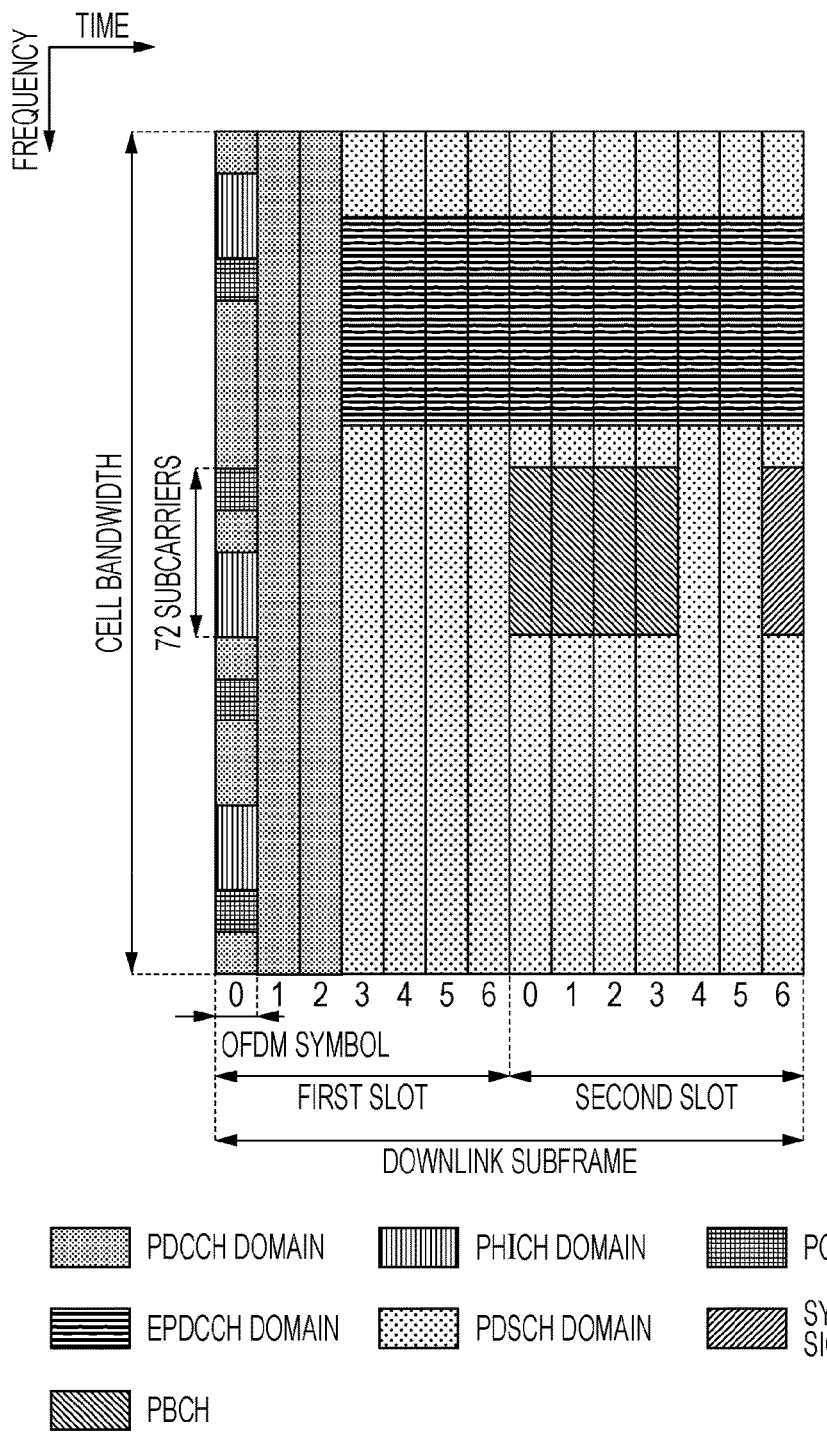
FIG. 4 illustrates one example of arrangement of a physical channel and a physical signal in a downlink subframe of the present embodiment.

FIG. 4 illustrates one example of arrangement of a physical channel and a physical signal in a downlink subframe of the present embodiment. The base station device 3 is able to transmit a downlink physical channel (PBCH, PCFICH, PHICH, PDCCH, EPDCCH, PDSCH) and/or a downlink physical signal (synchronization signal, downlink reference signal) in the downlink subframe. Note that, the PBCH is transmitted only in a subframe 0 within a radio frame. Note that, the downlink reference signal is arranged in a resource element distributed in the frequency domain and the time domain. For simplification of the description, the downlink reference signal is not illustrated in FIG. 4.

In a PDCCH domain, a plurality of PDCCHs may be subjected to frequency, time, and/or spatial multiplexing. In an EPDCCH domain, a plurality of EPDCCHs may be subjected to frequency, time, and/or spatial multiplexing. In a PDSCH domain, a plurality of PDSCHs may be subjected to frequency, time, and/or spatial multiplexing. The PDCCH, the PDSCH, and/or the EPDCCH may be subjected to frequency, time, and/or spatial multiplexing.

Figure 5:
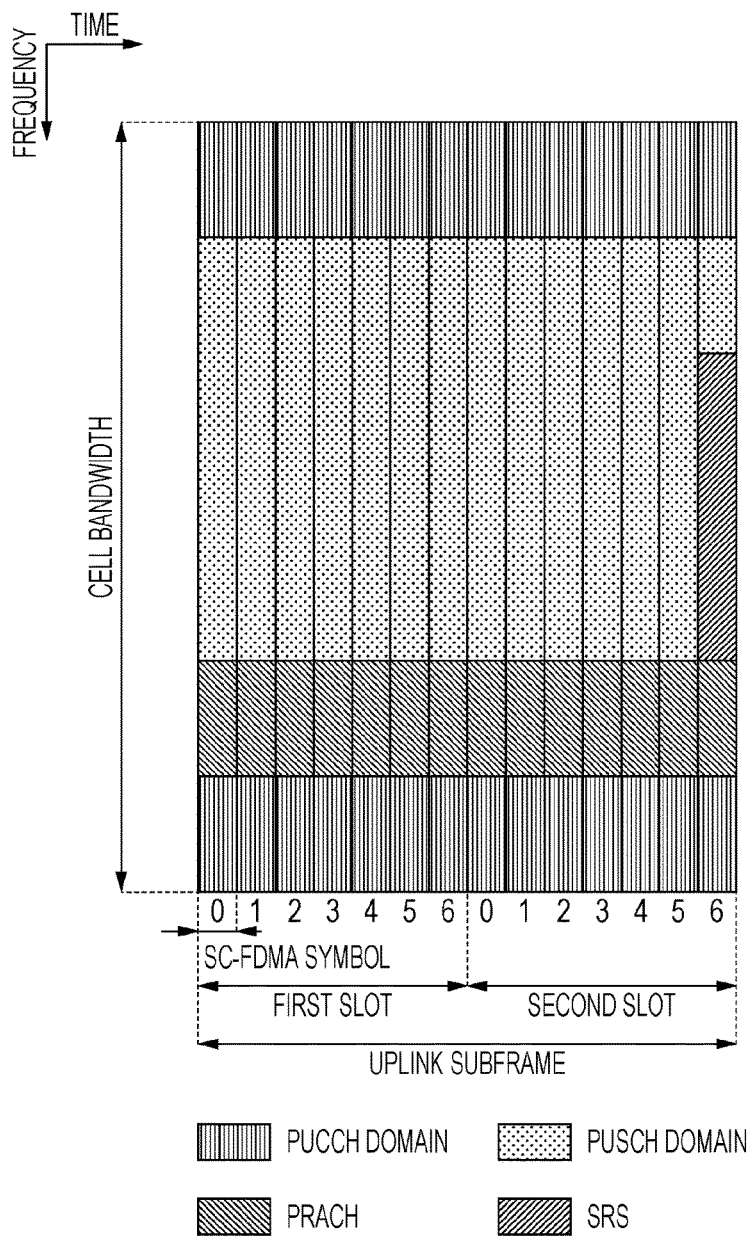
FIG. 5 illustrates one example of arrangement of a physical channel and a physical signal in an uplink subframe of the present embodiment.

FIG. 5 illustrates one example of arrangement of a physical channel and a physical signal in an uplink subframe of the present embodiment. The terminal device 1 may transmit an uplink physical channel (PUCCH, PUSCH, PRACH) and an uplink physical signal (UL-DMRS, SRS) in the uplink subframe. In a PUCCH domain, a plurality of PUCCHs are subjected to frequency, time, spatial, and/or code multiplexing. In a PUSCH domain, a plurality of PUSCHs may be subjected to frequency, time, spatial, and/or code multiplexing. The PUCCH and the PUSCH may be subjected to frequency, time, spatial, and/or code multiplexing. The PRACH may be arranged in a single subframe or over two subframes. A plurality of PRACHs may be subjected to code multiplexing.

The SRS is transmitted by using the last SC-FDMA symbol in the uplink subframe. That is, the SRS is arranged in the last SC-FDMA symbol in the uplink subframe. The terminal device 1 is able to limit simultaneous transmission of the SRS with the PUCCH/PUSCH/PRACH in a single SC-FDMA symbol of a single cell. In a single uplink subframe of a single cell, the terminal device 1 is able to transmit the PUSCH and/or the PUCCH by using SC-FDMA symbols other than the last SC-FDMA symbol within the uplink subframe and transmit the SRS by using the last SC-FDMA symbol within the uplink subframe. That is, the terminal device 1 is able to transmit the SRS, the PUSCH, and the PUCCH in a single uplink subframe of a single cell. Note that, the DMRS is able to be time-multiplexed with the PUCCH or the PUSCH. For simplification of the description, the DMRS is not illustrated in FIG. 5.

Figure 6:
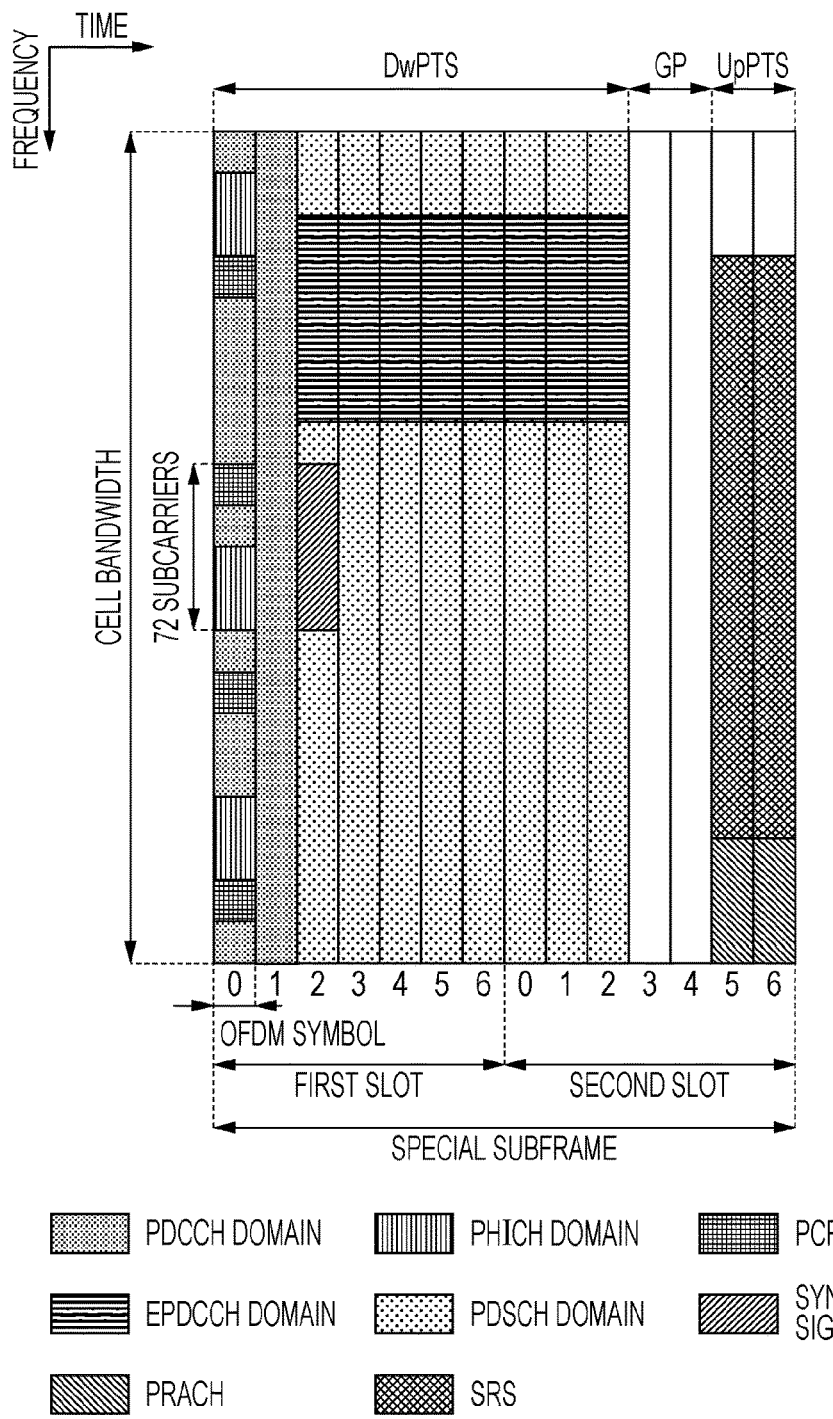
FIG. 6 illustrates one example of arrangement of a physical channel and a physical signal in a special subframe of the present embodiment.

FIG. 6 illustrates one example of arrangement of a physical channel and a physical signal in a special subframe of the present embodiment. In FIG. 6, the DwPTS is constituted by first to tenth SC-FDMA symbols in the special subframe, the GP is constituted by eleventh and twelfth SC-FDMA symbols in the special subframe, and the UpPTS is constituted by thirteenth and fourteenth SC-FDMA symbols in the special subframe.

The base station device 3 may transmit the PCFICH, the PHICH, the PDCCH, the EPDCCH, the PDSCH, the synchronization signal, and the downlink reference signal in the DwPTS of the special subframe. The base station device 3 is able to limit transmission of the PBCH in the DwPTS of the special subframe. The terminal device 1 may transmit the PRACH and the SRS in the UpPTS of the special subframe. That is, the terminal device 1 is able to limit transmission of the PUCCH, the PUSCH, and the DMRS in the UpPTS of the special subframe.

Figure 7:
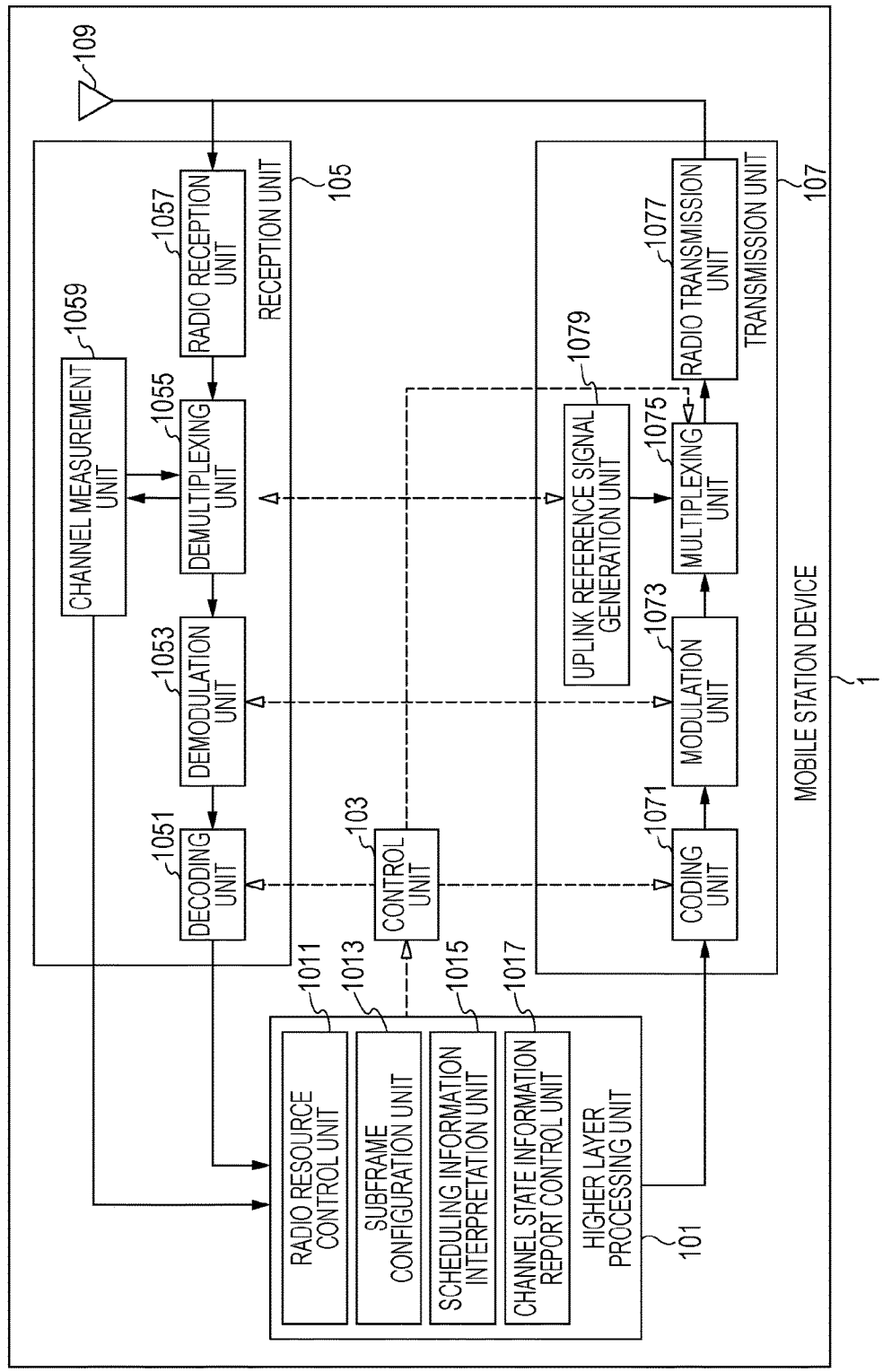
FIG. 7 is a schematic block diagram illustrating a configuration of a terminal device 1 of the present embodiment.

FIG. 7 is a schematic block diagram illustrating a configuration of the terminal device 1 of the present embodiment. As illustrated therein, the terminal device 1 includes a higher layer processing unit 101, a control unit 103, a reception unit 105, a transmission unit 107, and a transmit/receive antenna 109. The higher layer processing unit 101 includes a radio resource control unit 1011, a subframe configuration unit 1013, a scheduling information interpretation unit 1015, and a channel state information (CSI) report control unit 1017. The reception unit 105 includes a decoding unit 1051, a demodulation unit 1053, a demultiplexing unit 1055, a radio reception unit 1057, and a channel measurement unit 1059. The transmission unit 107 includes a coding unit 1071, a modulation unit 1073, a multiplexing unit 1075, a radio transmission unit 1077, and an uplink reference signal generation unit 1079.

The higher layer processing unit 101 outputs uplink data (transport blocks) generated by a user operation or the like to the transmission unit 107. In addition, the higher layer processing unit 101 performs processing in a medium access control (MAC) layer, a packet data convergence protocol (PDCP) layer, a radio link control (RLC) layer, and a radio resource control (RRC) layer. When performing carrier aggregation, the higher layer processing unit 101 has a function of performing control of physical layers for performing activation/deactivation of a cell and a function of performing control of a physical layer for managing transmission timing of uplink. The higher layer processing unit 101 has a function of instructing measurement to be calculated by the reception unit 105 and judging whether or not to report (transfer) a measurement result calculated by the reception unit 105.

The radio resource control unit 1011 provided in the higher layer processing unit 101 manages various configuration information of the terminal device 1. The radio resource control unit 1011 generates information to be arranged in each uplink channel and outputs the information to the transmission unit 107.

The subframe configuration unit 1013 provided in the higher layer processing unit 101 manages a subframe configuration in the base station device 3 and/or a base station device different from the base station device 3 based on information configured by the base station device 3. For example, the subframe configuration is an uplink or downlink configuration for a subframe. The subframe configuration includes a subframe pattern configuration, an uplink-downlink configuration, an uplink reference UL-DL configuration (uplink reference configuration), a downlink reference UL-DL configuration (downlink reference configuration), and/or a transmission direction UL-DL configuration (transmission direction configuration). The subframe configuration unit 1013 sets the subframe configuration, the subframe pattern configuration, the uplink-downlink configuration, the uplink reference UL-DL configuration, the downlink reference UL-DL configuration, and/or the transmission direction UL-DL configuration. In addition, the subframe configuration unit 1013 is able to set at least two subframe sets. Note that, the subframe pattern configuration includes an EPDCCH subframe configuration. Note that, the subframe configuration unit 1013 is also referred to as a terminal subframe configuration unit.

The scheduling information interpretation unit 1015 provided in the higher layer processing unit 101 interprets a DCI format (scheduling information) received through the reception unit 105, generates control information for controlling the reception unit 105 and the transmission unit 107 based on a result of interpreting the DCI format, and outputs the control information to the control unit 103.

Based on the subframe configuration, the subframe pattern configuration, the uplink-downlink configuration, the uplink reference UL-DL configuration, the downlink reference UL-DL configuration, and/or the transmission direction UL-DL configuration, the scheduling information interpretation unit 1015 determines timings at which transmission processing and reception processing are performed.

The CSI report control unit 1017 specifies a CSI reference resource. The CSI report control unit 1017 instructs the channel measurement unit 1059 to derive a CQI associated with the CSI reference resource. The CSI report control unit 1017 instructs the transmission unit 107 to transmit the CQI. The CSI report control unit 1017 sets a configuration used by the channel measurement unit 1059 to calculate the CQI.

Based the control information from the higher layer processing unit 101, the control unit 103 generates a control signal that controls the reception unit 105 and the transmission unit 107. The control unit 103 outputs the generated control signal to the reception unit 105 and the transmission unit 107, and controls the reception unit 105 and the transmission unit 107.

The reception unit 105, following the control signal input from the control unit 103, demultiplexes, demodulates, and decodes a reception signal received from the base station device 3 via the transmit/receive antenna 109. The reception unit 105 outputs the decoded information to the higher layer processing unit 101.

The radio reception unit 1057 down-converts a downlink signal received via the transmit/receive antenna 109 to an intermediate frequency, removes unnecessary frequency components, controls an amplification level so that a signal level is suitably maintained, conducts orthogonal demodulation based on in-phase components and orthogonal components of the received signal, and converts the orthogonally demodulated analog signal into a digital signal. The radio reception unit 1057 removes a portion corresponding to a guard interval (GI) from the converted digital signal, applies the Fast Fourier Transform (FFT) to the signal with the guard interval removed, and extracts a signal in the frequency domain.

The demultiplexing unit 1055 demultiplexes the extracted signal into the PHICH, the PDCCH, the EPDCCH, the PDSCH, and/or the downlink reference signal. Moreover, the demultiplexing unit 1055 compensates channels of the PHICH, the PDCCH, the EPDCCH, and/or the PDSCH from estimated channel values input from the channel measurement unit 1059. In addition, the demultiplexing unit 1055 outputs the demultiplexed downlink reference signal to the channel measurement unit 1059.

The demodulation unit 1053 multiplies the PHICH by a corresponding code to combine, performs demodulation according to a BPSK (Binary Phase Shift Keying) modulation scheme for the combined signal, and outputs the resultant to the decoding unit 1051. The decoding unit 1051 decodes the PHICH addressed to the terminal device 1, and outputs a decoded HARQ indicator to the higher layer processing unit 101. The demodulation unit 1053 performs demodulation according to a QPSK modulation scheme for the PDCCH and/or the EPDCCH, and outputs the resultant to the decoding unit 1051. The decoding unit 1051 attempts decoding of the PDCCH and/or the EPDCCH, and in the case of successful decoding, outputs decoded downlink control information and RNTI included in the downlink control information to the higher layer processing unit 101.

The demodulation unit 1053 performs demodulation for the PDSCH according to a modulation scheme notified in the downlink grant, such as QPSK (Quadrature Phase Shift Keying), 16QAM (Quadrature Amplitude Modulation), or 64QAM, and outputs the resultant to the decoding unit 1051. The decoding unit 1051 performs decoding based on information related to a coding rate notified in the downlink control information, and outputs the decoded downlink data (transport blocks) to the higher layer processing unit 101.

The channel measurement unit 1059 measures a downlink path loss and a channel state from the downlink reference signal input from the demultiplexing unit 1055, and outputs the measured path loss and channel state to the higher layer processing unit 101. In addition, the channel measurement unit 1059 calculates an estimated downlink channel value from the downlink reference signal, and outputs the estimated value to the demultiplexing unit 1055. The channel measurement unit 1059 performs channel measurement and/or interference measurement for calculation of the CQI. The channel measurement unit 1059 performs measurement to be notified to a higher layer from the downlink reference signal input from the demultiplexing unit 1055. The channel measurement unit 1059 calculates RSRP and RSRQ and outputs the resultant to the higher layer processing unit 101.

The transmission unit 107, following a control signal input from the control unit 103, generates an uplink reference signal, codes and modulates uplink data (transport blocks) input from the higher layer processing unit 101, and multiplexes the PUCCH, the PUSCH, and the generated uplink reference signal, followed by transmission to the base station device 3 via the transmit/receive antenna 109.

The coding unit 1071 codes uplink control information input from the higher layer processing unit 101 by means of convolutional coding, block coding, or the like. In addition, the coding unit 1071 performs turbo coding based on information used for scheduling of the PUSCH.

The modulation unit 1073 modulates a coded bit input from the coding unit 1071 according to a modulation scheme notified in the downlink control information or a modulation scheme predetermined for each channel, such as BPSK, QPSK, 16QAM, or 64QAM. Based on information used for scheduling of the PUSCH, the modulation unit 1073 determines the number of data sequences to be spatially multiplexed, maps a plurality of pieces of uplink data to be transmitted in the same PUSCH by using MIMO SM (Multiple Input Multiple Output Spatial Multiplexing) to a plurality of sequences, and performs precoding for the sequences.

The uplink reference signal generation unit 1079 generates a sequence obtained according to predetermined rules (formulas), based on a physical layer cell identity (PCI; also referred to as a Cell ID) or the like for identifying the base station device 3, a bandwidth in which the uplink reference signal is arranged, a cyclic shift notified in the uplink grant, values of parameters for generating a DMRS sequence, and the like. The multiplexing unit 1075, following the control signal input from the control unit 103, reorders the PUSCH modulation symbols in parallel and then applies the Discrete Fourier Transform (DFT). In addition, the multiplexing unit 1075 multiplexes the PUCCH and PUSCH signals and the generated uplink reference signal for each transmit antenna port. That is, the multiplexing unit 1075 arranges the PUCCH and PUSCH signals and the generated uplink reference signal into resource elements for each transmit antenna port.

The radio transmission unit 1077 applies the Inverse Fast Fourier Transform (IFFT) to the multiplexed signal, performs modulation according to a SC-FDMA scheme, adds a guard interval to the SC-FDMA symbols subjected to SC-FDMA modulation, generates a digital signal in a baseband, converts the digital signal in the baseband to an analog signal, generates in-phase components and orthogonal components of an intermediate frequency from the analog signal, removes excess frequency components from an intermediate frequency band, up-converts the signal of the intermediate frequency to a signal of high frequency, removes excess frequency components, amplifies power, and outputs the resultant to the transmit/receive antenna 109 for transmission.

Figure 8:
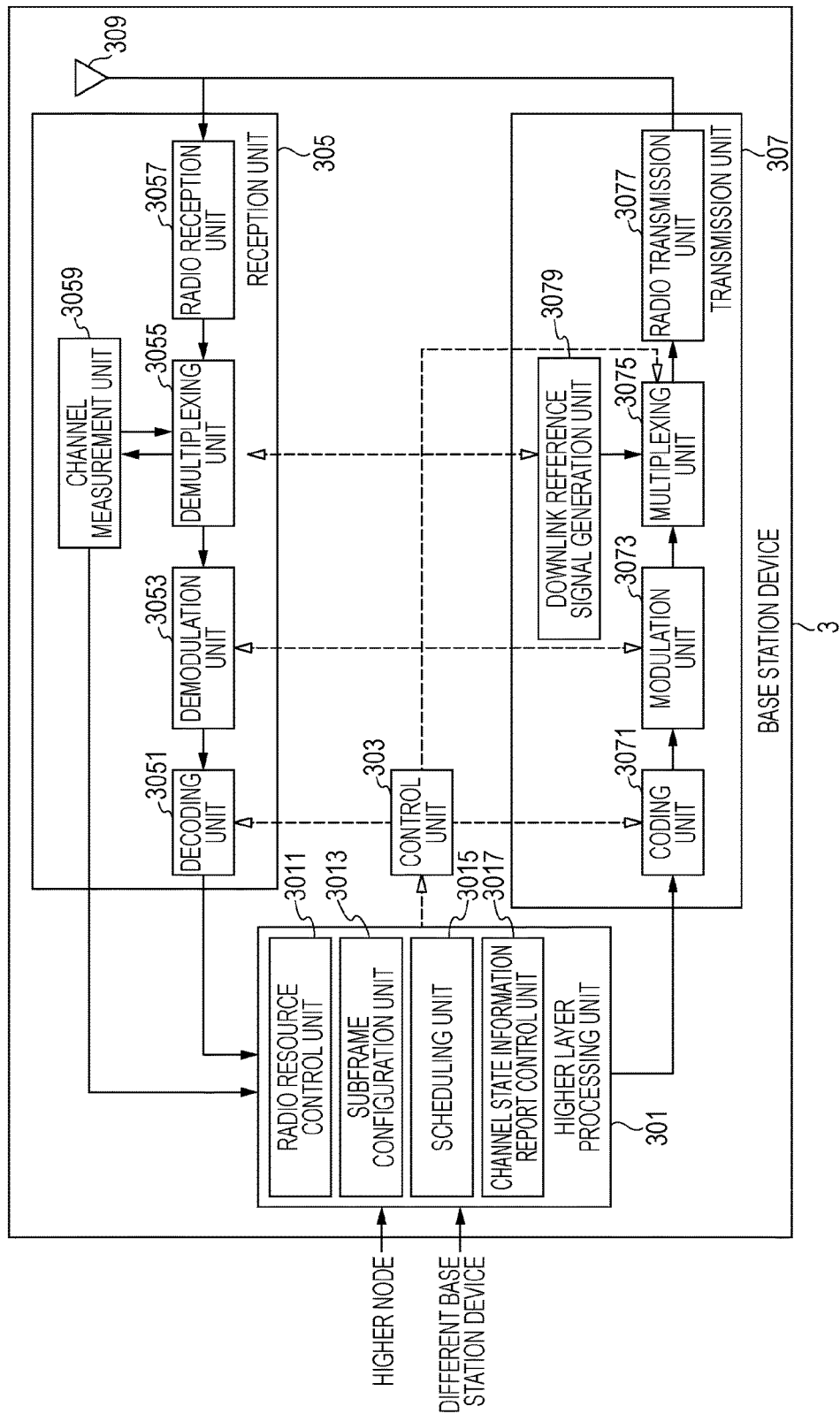
FIG. 8 is a schematic block diagram illustrating a configuration of a base station device 3 of the present embodiment.

FIG. 8 is a schematic block diagram illustrating a configuration of the base station device 3 of the present embodiment. As illustrated therein, the base station device 3 includes a higher layer processing unit 301, a control unit 303, a reception unit 305, a transmission unit 307, and a transmit/receive antenna 309. In addition, the higher layer processing unit 301 includes a radio resource control unit 3011, a subframe configuration unit 3013, a scheduling unit 3015, and a CSI report control unit 3017. In addition, the reception unit 305 includes a decoding unit 3051, a demodulation unit 3053, a demultiplexing unit 3055, a radio reception unit 3057, and a channel measurement unit 3059. In addition, the transmission unit 307 includes a coding unit 3071, a modulation unit 3073, a multiplexing unit 3075, a radio transmission unit 3077, and a downlink reference signal generation unit 3079.

The higher layer processing unit 301 performs processing in a medium access control (MAC) layer, a packet data convergence protocol (PDCP) layer, a radio link control (RLC) layer, and a radio resource control (RRC) layer. In addition, the higher layer processing unit 301 generates control information for controlling the reception unit 305 and the transmission unit 307, and outputs the control information to the control unit 303. The higher layer processing unit 301 has a function of acquiring a reported (transferred) measurement result.

The radio resource control unit 3011 provided in the higher layer processing unit 301 generates, or acquires from a higher node, downlink data (transport blocks) to be arranged in the downlink PDSCH, system information, an RRC message, and a MAC CE (control element), and performs output to the transmission unit 307. In addition, the radio resource control unit 3011 manages various configuration information for each terminal device 1.

The subframe configuration unit 3013 provided in the higher layer processing unit 301 performs management of a subframe configuration, a subframe pattern configuration, an uplink-downlink configuration, an uplink reference UL-DL configuration, a downlink reference UL-DL configuration, and/or a transmission direction UL-DL configuration for each terminal device 1. The subframe configuration unit 3013 sets the subframe configuration, the subframe pattern configuration, the uplink-downlink configuration, the uplink reference UL-DL configuration, the downlink reference UL-DL configuration, and/or the transmission direction UL-DL configuration to each terminal device 1. The subframe configuration unit 3013 transmits information related to the subframe configuration to the terminal device 1. Note that, the subframe configuration unit 3013 is also referred to as a base station subframe configuration unit.

The base station device 3 may determine the subframe configuration, the subframe pattern configuration, the uplink-downlink configuration, the uplink reference UL-DL configuration, the downlink reference UL-DL configuration, and/or the transmission direction UL-DL configuration to each terminal device 1. In addition, the subframe configuration, the subframe pattern configuration, the uplink-downlink configuration, the uplink reference UL-DL configuration, the downlink reference UL-DL configuration, and/or the transmission direction UL-DL configuration to each terminal device 1 may be instructed to the base station device 3 from a higher node.

For example, the subframe configuration unit 3013 may determine the subframe configuration, the subframe pattern configuration, the uplink-downlink configuration, the uplink reference UL-DL configuration, the downlink reference UL-DL configuration, and/or the transmission direction UL-DL configuration based on an uplink traffic amount and a downlink traffic amount.

The subframe configuration unit 3013 is able to manage at least two subframe sets. The subframe configuration unit 3013 may set at least two subframe sets to each terminal device 1. The subframe configuration unit 3013 may set at least two subframe sets to each serving cell. The subframe configuration unit 3013 may set at least two subframe sets to each CSI process. The subframe configuration unit 3013 is able to transmit information indicating at least two subframe sets to the terminal device 1 through the transmission unit 307.

The scheduling unit 3015 provided in the higher layer processing unit 301 determines frequencies and subframes to which physical channels (PDSCH and PUSCH) are to be allocated, a coding rate and a modulation scheme of the physical channels (PDSCH and PUSCH), transmit power, and the like from received channel state information, and estimated channel values and channel quality input from the channel measurement unit 3059. The scheduling unit 3015 determines whether to perform scheduling of a downlink physical channel and/or a downlink physical signal or scheduling of an uplink physical channel and/or an uplink physical signal in a flexible subframe. Based on a scheduling result, the scheduling unit 3015 generates control information (for example, DCI format) for controlling the reception unit 305 and the transmission unit 307, and outputs the control information to the control unit 303.

Based on a scheduling result, the scheduling unit 3015 generates information used for scheduling of the physical channels (PDSCH and PUSCH). Based on the UL-DL configuration, the subframe pattern configuration, the uplink-downlink configuration, the uplink reference UL-DL configuration, the downlink reference UL-DL configuration, and/or the transmission direction UL-DL configuration, the scheduling unit 3015 determines timings (subframes) at which transmission processing and reception processing are performed.

The CSI report control unit 3017 provided in the higher layer processing unit 301 controls CSI report of the terminal device 1. The CSI report control unit 3017 transmits information indicating various configuration assumed for deriving a CQI in a CSI reference resource by the terminal device 1 to the terminal device 1 through the transmission unit 307.

Based on the control information from the higher layer processing unit 301, the control unit 303 generates a control signal that controls the reception unit 305 and the transmission unit 307. The control unit 303 outputs the generated control signal to the reception unit 305 and the transmission unit 307, and controls the reception unit 305 and the transmission unit 307.

The reception unit 305, following the control signal input from the control unit 303, demultiplexes, demodulates, and decodes a reception signal received from the terminal device 1 via the transmit/receive antenna 309, and outputs decoded information to the higher layer processing unit 301. The radio reception unit 3057 down-converts an uplink signal received via the transmit/receive antenna 309 to an intermediate frequency, removes unnecessary frequency components, controls an amplification level so that a signal level is suitably maintained, performs orthogonal demodulation based on in-phase components and orthogonal components of the received signal, and converts the orthogonally demodulated analog signal into a digital signal.

The radio reception unit 3057 removes a portion corresponding to a guard interval (GI) from the converted digital signal. The radio reception unit 3057 applies the Fast Fourier Transform (FFT) to the signal with the guard interval removed, extracts a signal in the frequency domain, and outputs the signal to the demultiplexing unit 3055.

The demultiplexing unit 1055 demultiplexes the signal input from the radio reception unit 3057 into signals such as the PUCCH, the PUSCH, and the uplink reference signal. Note that, this demultiplexing is performed based on radio resource allocation information included in an uplink grant which is determined by the radio resource control unit 3011 of the base station device 3 in advance and notified to each terminal device 1. The demultiplexing unit 3055 compensates the channel of the PUCCH and PUSCH from an estimated channel value input from the channel measurement unit 3059. In addition, the demultiplexing unit 3055 outputs the demultiplexed uplink reference signal to the channel measurement unit 3059.

The demodulation unit 3053 applies the Inverse Discrete Fourier Transform (IDFT) to the PUSCH, acquires modulation symbols, and for each modulation symbol in the PUCCH and the PUSCH, demodulates the received signal by using a modulation scheme that is predetermined or notified in advance by the base station device 3 to each terminal device 1 in the uplink grant, such as BPSK (binary phase shift keying), QPSK, 16QAM, or 64QAM. The demodulation unit 3053 separates the modulation symbols in a plurality of pieces of uplink data transmitted on the same PUSCH by using MIMO SM, based on the number of spatially multiplexed sequences notified in advance in the uplink grant to each terminal device 1, and information giving instructions on precoding to be performed for these sequences.

The decoding unit 3051 decodes coded bits of the demodulated PUCCH and PUSCH according to a predetermined coding scheme at a coding rate that is predetermined or notified in advance by the base station device 3 to the terminal device 1 in the uplink grant, and outputs the decoded uplink data and uplink control information to the higher layer processing unit 101. In a case where the PUSCH is retransmitted, the decoding unit 3051 performs decoding by using coded bits and demodulated coded bits that are held in a HARQ buffer input from the higher layer processing unit 301. The channel measurement unit 309 measures an estimated channel value, channel quality, and the like from the uplink reference signal input from the demultiplexing unit 3055, and outputs the resultant to the demultiplexing unit 3055 and the higher layer processing unit 301.

The transmission unit 307, following the control signal input from the control unit 303, generates a downlink reference signal, codes and modulates a HARQ indicator, downlink control information, and downlink data input from the higher layer processing unit 301, multiplexes the PHICH, the PDCCH, the EPDCCH, the PDSCH, and the downlink reference signal, and transmits a signal to the terminal device 1 via the transmit/receive antenna 309.

The coding unit 3071 codes a HARQ indicator, downlink control information, and downlink data input from the higher layer processing unit 301 by using a predetermined coding scheme, such as block coding, convolutional coding, or turbo coding, or alternatively, performs coding by using a coding scheme determined by the radio resource control unit 3011. The modulation unit 3073 modulates coded bits input from the coding unit 3071 according to a modulation scheme that is predetermined or determined by the radio resource control unit 3011, such as BPSK, QPSK, 16QAM, or 64QAM.

The downlink reference signal generation unit 3079 generates, as a downlink reference signal, a sequence known to the terminal device 1 and obtained according to predetermined rules based on a physical layer cell identity (PCI) for identifying the base station device 3. The multiplexing unit 3075 multiplexes the modulated modulation symbols of each channel and the generated downlink reference signal. That is, the multiplexing unit 3075 arranges the modulated modulation symbols of each channel and the generated downlink reference signal into resource elements.

The radio transmission unit 3077 applies the Inverse Fast Fourier Transform (IFFT) to the multiplexed modulation symbols and the like, performs modulation according to the OFDM scheme, adds a guard interval to the OFDM modulated OFDM symbols, generates a digital signal in a baseband, converts the digital signal in the baseband to an analog signal, generates in-phase components and orthogonal components of an intermediate frequency from the analog signal, removes excess frequency components from the intermediate frequency band, up-converts the signal of intermediate frequency to a signal of high frequency, removes excess frequency components, amplifies power, and outputs the resultant to the transmit/receive antenna 309 for transmission.

Here, the PDCCH or the EPDCCH is used to notify (designate) downlink control information (DCI) to a terminal device. For example, the downlink control information includes information about resource allocation of the PDSCH, information about MCS (Modulation and Coding scheme), information about scrambling identity (also referred to as scrambling identifier), reference signal sequence identity (also referred to as base sequence identity, base sequence identifier, or base sequence index), and the like.

A small cell will be described below. The small cell is a collective term indicating a cell which is constituted by a base station device with less transmit power than that of a macro cell and has small coverage. Small cells are able to be operated being arranged densely because of being able to have smaller coverage. A base station device in a small cell is arranged at a place different from that of a base station device in a macro cell. The small cells arranged densely are synchronized with each other to be formed as a small cell cluster. The cells in the small cell cluster are connected by backhaul (optical fiber, X2 interface, S1 interface), and a technique of interference suppression, such as eICIC (enhanced Inter-Cell Interference Coordination), FeICIC (Further enhanced Inter-Cell Interference Coordination), or CoMP (Coordinated Multi-Point transmission/reception), is able to be applied in the small cells in the small cell cluster. The small cell may be operated in a frequency band different from that of the macro cell. In particular, from a viewpoint of channel attenuation (path loss), by operating the small cell in a higher frequency band than that of the macro cell, it becomes easy to form the small cell with smaller coverage.

The small cell operated in a different frequency band is operated by using the macro cell and a carrier aggregation technique or a dual connectivity technique.

Note that, the small cell may be operated at the same frequency as that of the macro cell. The small cell may be operated out of the coverage of the macro cell. The base station device in the small cell may be arranged in the same place as that of the base station device in the macro cell.

The carrier aggregation technique will be described in detail below.

Dependently on capacity of a terminal device, a secondary cell is configured to form a serving cell set with a primary cell. The number of downlink component carriers configured to the terminal device needs to be greater than or the same as the number of uplink component carriers configured to the terminal device, and only the uplink component carriers are not able to be configured as secondary cells.

The primary cell is always used for transmission of the PUCCH. In other words, PUCCH is not able to be transmitted in the secondary cell.

Reconfiguration/addition/deletion of the secondary cell are performed by RRC. When a new secondary cell is added, all system information needed for the new secondary cell is transmitted by dedicated RRC signaling. That is, system information does not need to be directly obtained from the secondary cell by means of reporting in a connected mode.

When the carrier aggregation is configured, a mechanism of activation/deactivation of the secondary cell is supported. The activation/deactivation is not applied to the primary cell. When the secondary cell is deactivated, the terminal device does not need to receive the associated PDCCH or PDSCH, and is not able to perform transmission in associated uplink and does not need to perform CQI measurement. To the contrary, when the secondary cell is deactivated, the terminal device needs to receive the PDSCH and the PDCCH and is expected to be able to perform CQI measurement.

The mechanism of activation/deactivation is based on a combination of MAC CE and a deactivation timer. The MAC CE transfers information on activation or deactivation of the secondary cell with a bitmap. A bit to which 1 is set indicates activation of the associated secondary cell, and, to the contrary, a bit to which 0 is set indicates deactivation of the associated secondary cell.

Even when the base station device does not transmit data, the terminal device in an idle state transmits a synchronization signal, a reference signal, and broadcast information, such as PSS/SSS, CRS, PBCH, or SIB, for connecting to the base station device. Therefore, signals thereof cause inter-cell interference.

Then, by shifting the base station device from a start-up state to a stop state, the inter-cell interference is suppressed.

The stop state of the cell/base station device is a state where the PSS/SSS, the CRS, the PBCH, the PDCCH, or the PDSCH is not transmitted. An example thereof include a state where the PSS/SSS has not been transmitted for one half or more frame (five or more subframes). Note that, the base station device, even in the stop state, may perform reception processing at a reception unit of the base station device.

The start-up state of the cell/base station device is a state where at least the PSS/SSS and the CRS are transmitted. An example thereof include a state where the PSS/SSS is transmitted during one half frame.

Whether or not to shift the base station device in the start-up state to the stop state is determined, for example, based on a connected state of the terminal device, a data request situation of the terminal device connected to the base station device, measurement information on a physical layer from the terminal device, CSI information from the terminal device, or the like.

One example of procedure of shifting the base station device in the start-up state to the stop state will be described.

A base station device (serving cell) to which a terminal device is connected determines whether or not to be shifted to the stop state from the start-up state based on a connected state of the terminal device, a data situation of the terminal device, and measurement information of the terminal device. The base station device which has judged to be shifted to the stop state transmits information for shifting to the stop state to a base station device in a neighbour cell and performs preparation for the stop of a cell. The determination of whether or not to shift the start-up state to the stop state and the transmission of information for shifting to the stop state may not be performed in the serving cell, and the determination and the transmission may be performed, for example, in MME (Mobility Management Entity) and S-GW (Serving Gateway). In the preparation for the stop of the cell, when the terminal device is connected to the base station device, an instruction to cause the terminal device to perform handover to the neighbour cell, an instruction to perform deactivation, or the like is performed. The serving cell to which no terminal device is connected due to the preparation for the stop of the cell is shifted from the start-up state to the stop state.

When the terminal device communicates with the base station device in the stop state, the base station device is shifted from the stop state to the start-up state.

Whether or not to shift the base station device in the stop state to the start-up state is determined based on, for example, an uplink reference signal from the terminal device, cell detection information from the terminal device, measurement information on a physical layer of the terminal device, or the like.

One example of procedure of shifting a base station device in the stop state to the start-up state based on measurement information on a physical layer will be described.

A base station device (serving cell) to which a terminal device is connected and a base station device (neighbour cell) in the stop state share a configuration of a DRS through backhaul. The serving cell notifies the terminal device of the configuration of the DRS. The neighbour cell transmits the DRS. The terminal device detects the DRS transmitted from the neighbour cell based on the configuration of the DRS notified by the serving cell. Moreover, the terminal device performs measurement of a physical layer with use of the DRS transmitted from the neighbour cell. The terminal device reports (transfers) a measurement result to the serving cell. Based on the report of the measurement result from the terminal device, the serving cell determines whether or not to shift the base station device in the stop state to the start-up state, and when determining to shift to the start-up state, notifies the base station device in the stop state of information for instructing start-up. Note that, the determination of whether or not to shift the stop state to the start-up state and the transmission of the information for instructing start-up may not be performed in the serving cell, and the determination and the transmission may be performed, for example, in MME (Mobility Management Entity) and S-GW (Serving Gateway). The neighbour cell receiving the information for instructing start-up is shifted from the stop state to the start-up state.

One example of procedure of shifting a base station device in the stop state to the start-up state based on measurement information on a physical layer will be described.

A base station device (serving cell) to which a terminal device is connected and a base station device (neighbour cell) in the stop state share a configuration of an SRS of the terminal device through backhaul. The serving cell notifies the terminal device of the configuration of the SRS. The terminal device transmits the SRS based on the configuration of the SRS or an instruction of an SRS request. The neighbour cell detects the SRS transmitted from the terminal device. Moreover, the neighbour cell performs measurement of a physical layer with use of the SRS transmitted from the terminal device. Based on a measurement result by the SRS, the neighbour cell determines whether or not to shift the base station device to the start-up state and performs shift from the stop state to the start-up state. Note that, the determination of whether or not to shift the stop state to the start-up state may not be performed in the neighbour cell, and the determination and the transmission may be performed, for example, in a serving cell, MME (Mobility Management Entity), and S-GW (Serving Gateway). In this case, after performing measurement of the physical layer with use of the SRS, the neighbour cell transmits a measurement result to the serving cell, the MME, and the S-GW and receives information for instructing start-up.

The serving cell may notify the terminal device of information indicating a start-up/stop state of a neighbour cell. The terminal device recognizes the start-up state or the stop state of the cell to thereby switch behavior of the terminal device. An example of the behavior of the terminal device includes a method for measuring interference, or the like.

One example of a method for notifying information indicating a start-up/stop state of a cell will be described.

Information indicating a start-up/stop state of a target cell is notified by L1 signaling (Layer 1 signaling). In other words, the information indicating the start-up/stop state of the target cell is notified by the PDCCH or the EPDCCH. One bit corresponding to the target cell is allocated, and 0 (false, disable) indicates stop and 1 (true, enable) indicates start-up. The bit corresponding to the target cell may be constituted as a set of bitmaps so that the start-up/stop state is notified simultaneously to a plurality of cells. Association of the bit with the target cell is notified by dedicated RRC signaling.

The information indicating the start-up/stop state is notified by a DCI format 1C. Note that, the information indicating the start-up/stop state may be notified by a DCI format 3/3A. Note that, the information indicating the start-up/stop state may be notified by a format having the same payload size as that of the DCI format 1C.

The information indicating the start-up/stop state is notified by a shared search space. The shared search space is a search space shared between cells. In addition, the information indicating the start-up/stop state is notified by a search space shared in a terminal group. Here, the search space shared in a terminal group is a search space in which a start point of CCE in which PDCCH candidates are arranged is determined with use of RNTI (UE-group C-RNTI, TP-specific-RNTI, SCE-RNTI) allocated in the terminal group in a shared manner.

A notification period of the information indicating the start-up/stop state is one radio frame unit. The notification period of the information indicating the start-up/stop state is configured by dedicated RRC signaling.

In the notification of the information indicating the start-up/stop state, information on a next radio frame of the radio frame in which the L1 signaling is received is indicated. Note that, when the L1 signaling is received in the first subframe (subframe 0) within a radio frame, information on the radio frame in which the reception is performed may be indicated.

One example of a method for notifying information indicating a start-up/stop d state of a cell will be described.

Information indicating a start-up/stop state of a target cell is notified by a change in a configuration of the DRS. The configuration of the DRS when transmitted from the target cell becomes different between the start-up state and the stop state.

The information indicating the start-up/stop state of the target cell is notified by a specific example of a change of a configuration of following one or more DRSs. The DRS transmitted in the start-up state and the DRS transmitted in the stop state are different in arrangement of a resource element. The DRS transmitted in the start-up state and the DRS transmitted in the stop state are different in an antenna port. The DRS transmitted in the start-up state and the DRS transmitted in the stop state are different in a scramble sequence. The DRS transmitted in the start-up state and the DRS transmitted in the stop state are different in an initial value of the scramble sequence. The DRS transmitted in the start-up state and the DRS transmitted in the stop state are different in transmit power. The DRS transmitted in the start-up state and the DRS transmitted in the stop state are different in a subframe period of transmission. The DRS transmitted in the start-up state and the DRS transmitted in the stop state are different in a transmission bandwidth or the number of resource blocks.

The terminal device monitors two patterns of the configuration of the DRS indicating the start-up state and the configuration of the DRS indicating the stop state. The terminal device monitors two patterns by using a monitoring pattern for the configuration of the DRS indicating the start-up state and a monitoring pattern for the configuration of the DRS indicating the stop state. The terminal device implicitly acquires information on the start-up/stop state of the target cell according to the monitoring pattern by which the DRS is detected. The monitoring pattern for the configuration of the DRS indicating the start-up state and the monitoring pattern for the configuration of the DRS indicating the stop state may be defined in advance. The monitoring pattern for the configuration of the DRS indicating the start-up state and the monitoring pattern for the configuration of the DRS indicating the stop state may be notified from the base station device by dedicated RRC signaling.

One example of a method for notifying information indicating a start-up/stop state of a cell will be described.

Information indicating a start-up/stop state of a target cell is notified by a change in a configuration of the CRS. The configuration of the CRS transmitted from the target cell becomes different between the start-up state and the stop state.

The information indicating the start-up/stop state of the target cell is notified by a specific example of a change of following one or more CRSs. The CRS transmitted in the start-up state and the CRS transmitted in the stop state are different in arrangement of a resource element. The CRS transmitted in the start-up state and the CRS transmitted in the stop state are different in an antenna port. The CRS transmitted in the start-up state and the CRS transmitted in the stop state are different in a scramble sequence. The CRS transmitted in the start-up state and the CRS transmitted in the stop state are different in an initial value of the scramble sequence. The CRS transmitted in the start-up state and the CRS transmitted in the stop state are different in transmit power. The CRS transmitted in the start-up state and the CRS transmitted in the stop state are different in a subframe period of transmission. The CRS transmitted in the start-up state and the CRS transmitted in the stop state are different in a transmission bandwidth or the number of resource blocks.

The terminal device monitors two patterns of the configuration of the CRS indicating the start-up state and the configuration of the CRS indicating the stop state. The terminal device monitors two patterns by using a monitoring pattern for the configuration of the CRS indicating the start-up state and a monitoring pattern for the configuration of the CRS indicating the stop state. The terminal device implicitly acquires information on the start-up/stop state of the target cell according to the monitoring pattern by which the CRS is detected. The monitoring pattern for the configuration of the CRS indicating the stop state may be defined in advance. The monitoring pattern for the configuration of the CRS indicating the stop state may be notified from the base station device by dedicated RRC signaling.

One example of a method for notifying information indicating a start-up/stop state of a cell will be described.

Information indicating a start-up/stop state of a cell is notified by dedicated RRC signaling. The information indicating the start-up/stop state of the cell is notified as a list in association with a center frequency and a cell ID.

The terminal device is able to recognize a start-up/stop state of a target cell with the aforementioned notification methods. Hereinafter, when behavior of the terminal device is switched according to the start-up/stop state of the target cell, any of the aforementioned notification methods is applied.

Description will be given below for detection of a cell (base station device).

Detection of a cell means detection of a synchronization signal and/or a reference signal transmitted from a base station device constituting the cell by a terminal device. The synchronization signal and/or the reference signal used for detection of the cell include information on a cell ID. The terminal device detects the cell based on the cell ID of the cell and a detection reference of the synchronization signal and/or the reference signal.

One example of the detection reference of the synchronization signal and/or the reference signal will be described.

The terminal device determines detection based on intensity of receive power and/or receive power quality of the synchronization signal and/or the reference signal from the cell. The terminal device compares the intensity of receive power and/or the receive power quality of the synchronization signal and/or the reference signal to a threshold, and when the reception intensity and/or the receive power quality is greater, it is judged that the cell is detected. Examples of the receive power intensity include RSRP and the like. Examples of the reception quality include an amount of interference, RSRQ, SINR, and the like. The detection of the cell may be judged by a measurement event described below.

One example of the detection reference for the synchronization signal and/or the reference signal will be described.

The terminal device determines detection based on success or failure in decoding of information of the synchronization signal and/or the reference signal from the cell. For example, the cell transmits a parity code, such as CRC, to be carried on the synchronization signal and/or the reference signal. The terminal device performs decoding by using the parity code included in the synchronization signal and/or the reference signal, and when judging that the decoding is performed successfully by detection of the parity, judges that the cell is detected.

After detecting the cell in the terminal device, the terminal device selects a cell to be connected/activated and select a cell to be disconnected/deactivated.

Alternatively, after detecting the cell in the terminal device, the terminal device reports information on the detected cell to a connected base station device. The information on the detected cell includes a cell ID and information on measurement.

Details of the CRS will be described below.

The CRS is transmitted by antenna ports 0-3.

The CRS is arranged in all downlink subframes which are non-MBSFN subframes. In other words, the CRS is arranged in all downlink subframes other than MBSFN subframes.

A resource element and a signal sequence of the CRS are determined based on a physical cell identity (PCI).

Figure 10:
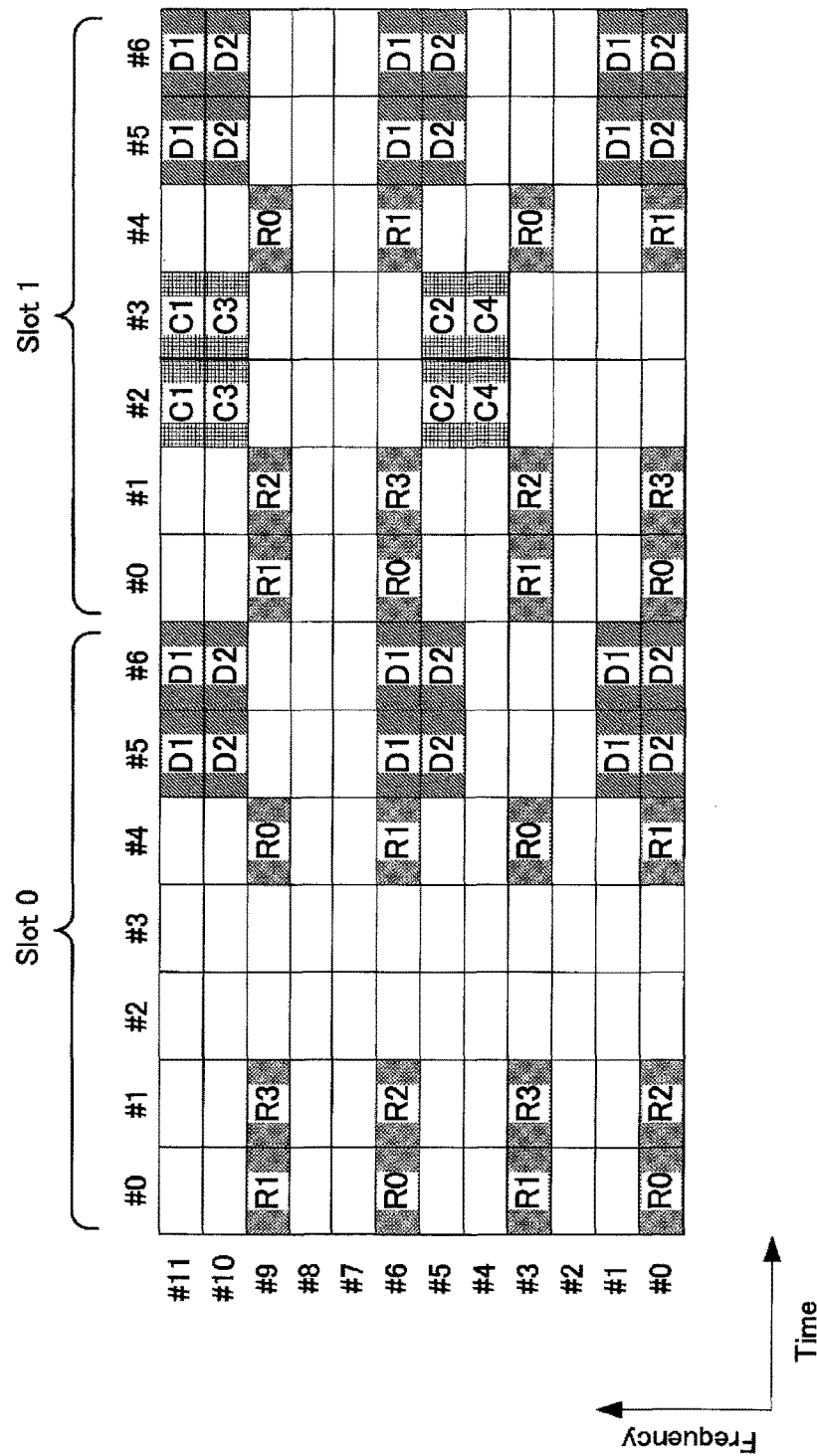
FIG. 10 illustrates one example of arrangement of the DRS.

FIG. 10 illustrates a configuration of the CRS. A signal of the CRS is generated by using a pseudo-random number sequence. The pseudo-random number sequence is, for example, a Gold sequence. The pseudo-random number sequence is calculated based on a physical cell identity (PCI). The pseudo-random number sequence is calculated based on a type of CP. The pseudo-random number sequence is calculated based on a slot number and an OFDM symbol number in a slot. As the resource element of the CRS in the case of normal CP, R0-3 of FIG. 10 are used. R0 indicates arrangement of the CRS of an antenna port 0, R1 indicates arrangement of the CRS of an antenna port 1, R2 indicates arrangement of the CRS of an antenna port 2, and R3 indicates arrangement of the CRS of an antenna port 3. The resource element of the CRS transmitted by one antenna port is arranged in a period of six subcarriers on a frequency axis. The resource element of the CRS transmitted by the antenna port 0 and the resource element of the CRS transmitted by the antenna port 1 are arranged to be separated from each other by three subcarriers. The CRS is cell-specifically shifted on the frequency based on a cell ID. The resource elements of the CRS transmitted by the antenna port 0 and the CRS transmitted by the antenna port 1 are arranged in OFDM symbols 0 and 4 in the case of normal CP, and arranged in OFDM symbols 0 and 3 in the case of extended CP. The resource elements of the CRS transmitted by an antenna port 2 and the CRS transmitted by an antenna port 3 are arranged in an OFDM symbol 1. The CRS is transmitted in a broadband with a bandwidth configured in downlink.

Details of the DRS will be described below. The DRS is transmitted from a base station device for various purposes, such as synchronization of a time domain in downlink, synchronization of a frequency in downlink, specification of a cell/transmission point, measurement of RSRP, measurement of RSRQ, and measurement of a geographic position of a terminal device.

The DRS is transmitted in a downlink subframe. The DRS is transmitted in a downlink component carrier.

The DRS is transmitted when the base station device is in a stop state. Note that, the DRS may be transmitted even when the base station device is in a start-up state.

The DRS is periodically transmitted on a time axis. The DRS is continuously transmitted for configured subframes. For example, the DRS is continuously transmitted for N subframes in a period of M subframe. The period M in which the DRS is transmitted, the number of subframes N to be continuously transmitted in the period, and a subframe L in which the DRS is arranged in the period are configured in a higher layer. Note that, the number of subframes N to be continuously transmitted in the period may be defined in advance. When the subframe period M is configured to be long, the number of times of transmission by the base station device in the stop state decreases, thus making it possible to reduce inter-cell interference. Note that, M, N, and L may be configured differently between the stop state and the start-up state for transmission.

The DRS is transmitted by including information on a cell ID. Here, the information on the cell ID is information for identifying a cell in which the DRS is transmitted. Examples thereof include a physical cell ID, CGI (Cell Global Identity), and a new cell identity (such as small cell ID, discovery ID, or extended cell ID). Note that, a plurality of IDs related to the cell may be transmitted by the DRS. For example, in an environment where the physical cell identity is insufficient for the number of cells to be arranged, the physical cell identity is able to be substantially extended by transmitting the physical cell identity and a new cell identity in combination in the DRS.

The DRS is transmitted by antenna ports p, . . . , and p+n−1. Here, n is a total number of antenna ports for transmitting the DRS. Values of p, . . . , and p+n−1 are values other than 0 to 22 and 107 to 110.

One example of a configuration of the DRS will be described.

Figure 9:
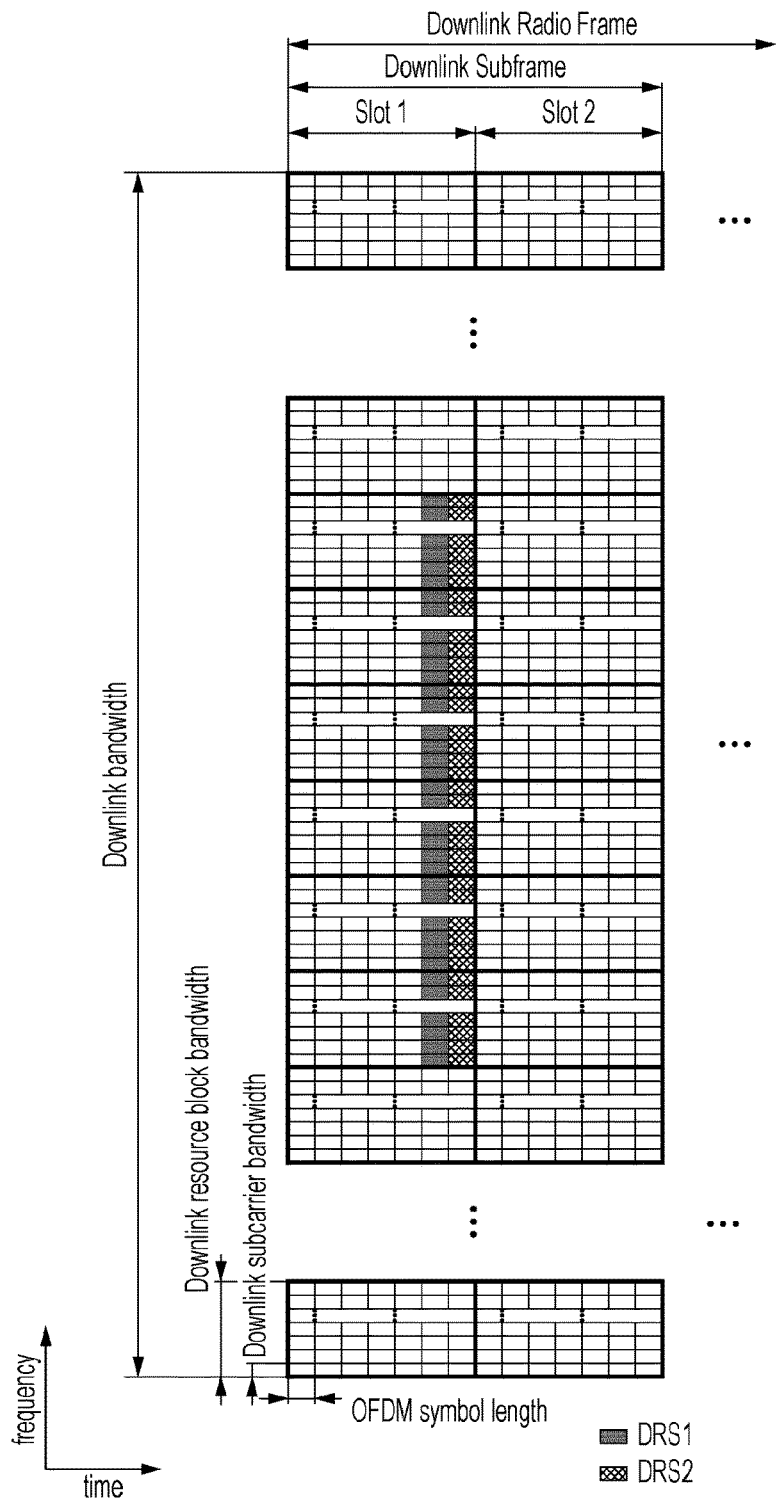
FIG. 9 illustrates one example of arrangement of a DRS.

FIG. 9 illustrates one example of the configuration of the DRS. A sequence used by a signal of the DRS is generated by a Zadoff-Chu sequence on a frequency axis. The DRS is contiguously arranged on the frequency axis. The DRS uses six resource blocks and is transmitted by using sixty-two subcarriers thereof. The DRS is transmitted with zero power in ten subcarriers of the six resource blocks. In other words, the DRS reserves ten subcarriers of the six resource blocks and does not transmit a signal therein. The DRS is arranged in the last OFDM symbols of a slot 0 and a slot 10 in the case of the FDD (frame configuration type 1) and are mapped to the third OFDM symbols of a subframe 1 and a subframe 6 in the case of the TDD (frame configuration type 2). The DRS is transmitted by including a part of information for specifying a cell ID.

Note that, the DRS may be arranged in a resource block different from that of the PSS. The DRS may be transmitted by using the different number of resource blocks from that of the PSS. The DRS may be transmitted by using the different number of subcarriers from that of the PSS. The DRS may be arranged in an OFDM symbol different from that of the PSS. The DRS may be transmitted by including information different from that of the cell ID.

One example of a configuration of the DRS will be described.

FIG. 9 illustrates one example of the configuration of the DRS. A sequence used by a signal of the DRS is interleaved by connecting two binary sequences having a length of 31. The sequence of the signal of the DRS is generated based on an M-sequence. In the DRS, a signal arranged in a subframe 0 is different from a signal arranged in a subframe 5. The DRS is arranged in sixth OFDM symbols of a slot 0 and a slot 10 in the case of the FDD and arranged in seventh OFDM symbols of a slot 1 and a slot 11 in the case of the TDD. In other words, the DRS is arranged in the second last OFDM symbols of the slot 0 and the slot 10 in the case of the FDD and arranged in the last OFDM symbols of the slot 1 and the slot 11 in the case of the TDD. The DRS may be transmitted by including a part of information for specifying a cell ID.

Note that, the DRS may be arranged in a resource block different from that of the SSS. The DRS may be transmitted by using the different number of resource blocks from that of the SSS. The DRS may be transmitted by using the different number of subcarriers from that of the SSS. The DRS may be arranged in an OFDM symbol different from that of the SSS. The DRS may be transmitted by including information different from that of the cell ID.

Note that, the number of subframes in which the DRS is transmitted is not limited. For example, the DRS may be transmitted in subframes 0, 1, 5, and 6. In this case, a large quantity of information is able to be included in the DRS for transmission. In this case, the number of orthogonal sequences increases, so that an effect of suppressing inter-cell interference is achieved.

One example of a configuration of the DRS will be described.

FIG. 10 illustrates one example of the configuration of the DRS. A signal of the DRS is generated by using a pseudo-random number sequence. The pseudo-random number sequence is, for example, a Gold sequence. The pseudo-random number sequence is calculated based on a cell ID. The pseudo-random number sequence is calculated based on a type of CP. The pseudo-random number sequence is calculated based on a slot number and an OFDM symbol number in a slot. A resource element of the DRS transmitted by one antenna port is arranged in a period of six subcarriers on a frequency axis. The resource element of the DRS transmitted by the antenna port p and the resource element of the DRS transmitted by the antenna port p+1 are arranged to be separated from each other by three subcarriers. The DRS is cell-specifically shifted on the frequency based on a cell ID. The resource elements of the DRS transmitted by the antenna port p and the DRS transmitted by the antenna port p+1 are arranged in OFDM symbols 0 and 4 in the case of normal CP, and arranged in OFDM symbols 0 and 3 in the case of extended CP. The resource elements of the DRS transmitted by an antenna port p+2 and the DRS transmitted by an antenna port p+3 are arranged in an OFDM symbol 1. The DRS is transmitted in a broadband with a bandwidth configured in downlink.

Note that, the DRS may use a pseudo-random number sequence different from that of the CRS. The DRS may use a sequence calculation method different from that of the CRS. The DRS may be arranged on the frequency in a period of frequency different from that of the CRS. An arrangement relation between the resource elements of the antenna port p by which the DRS is transmitted and the antenna port p+1 by which the DRS is transmitted may be different from an arrangement relation of the antenna port 0 and the antenna port 1. The DRS may be shifted to be arranged on the frequency based on information different from that of the CRS. The DRS may be arranged in an OFDM symbol different from that of the CRS. The DRS may be arranged with a bandwidth different from that of the CRS, or may be arranged with a bandwidth configured in a higher layer to be transmitted in a narrow band.

One example of a configuration of the DRS will be described.

Figure 11:
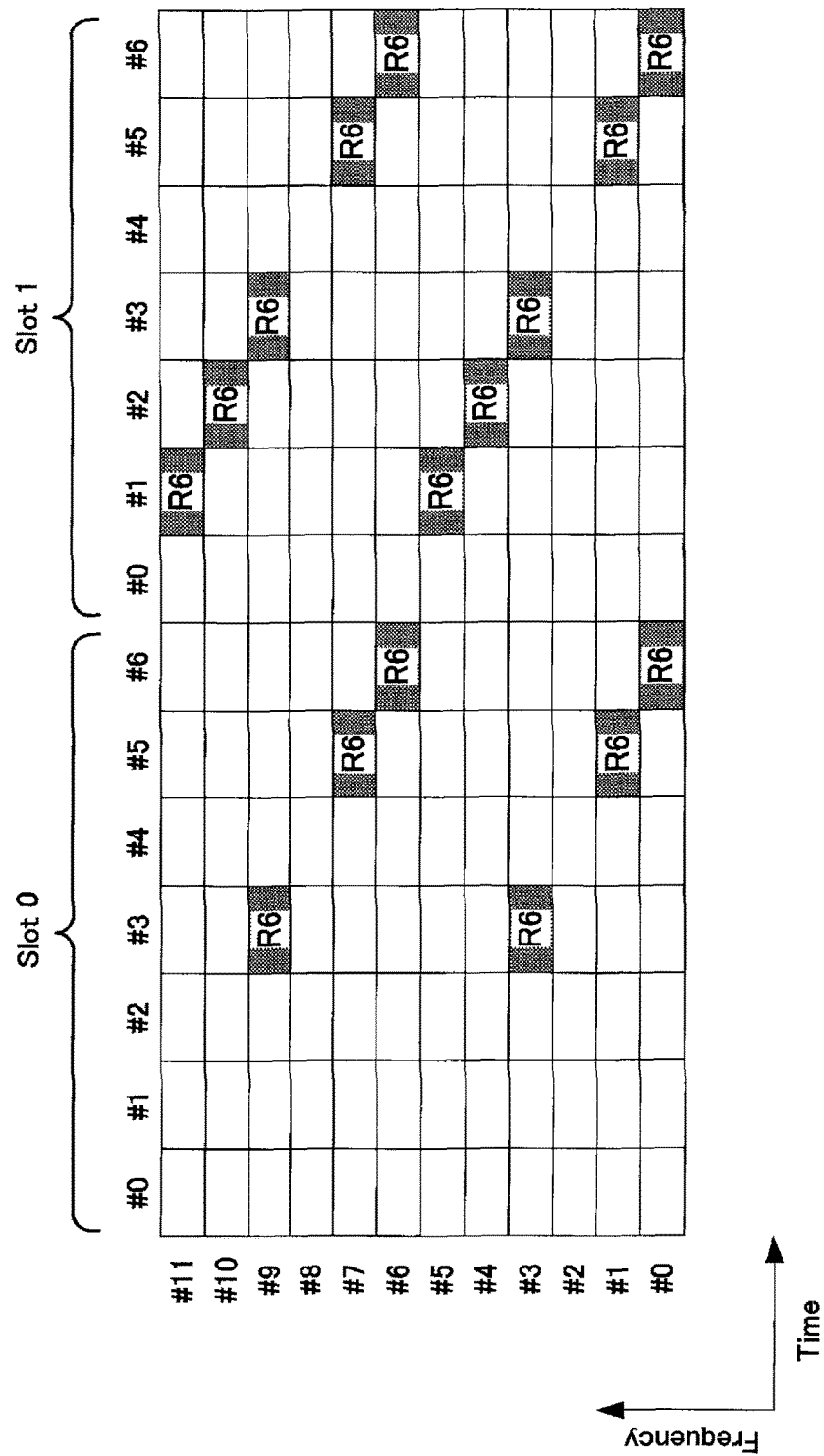
FIG. 11 illustrates one example of arrangement of the DRS.

FIG. 11 illustrates one example of the configuration of the DRS. A signal of the DRS is generated by using a pseudo-random number sequence. The pseudo-random number sequence is, for example, a Gold sequence. The pseudo-random number sequence is calculated based on a cell ID. The pseudo-random number sequence is calculated based on a type of CP. The pseudo-random number sequence is calculated based on a slot number and an OFDM symbol number in a slot. The DRS transmitted by one antenna port is arranged in a period of six subcarriers on a frequency axis. The DRS is cell-specifically shifted on the frequency based on a cell ID. The DRS is arranged in OFDM symbols 3, 5 and 6 of a slot 0 and OFDM symbols 1, 2, 3, 5 and 6 of a slot 1 in the case of normal CP, and arranged in OFDM symbols 4 and 5 of the slot 0 and OFDM symbols 1, 2, 4, and 5 of the slot 1 in the case of extended CP. The resource elements of the DRS is arranged being shifted by L on the frequency between the l-th OFDM symbol and the l+L-th OFDM symbol. The DRS is transmitted in a broadband with a bandwidth configured in downlink.

Note that, the DRS may use a pseudo-random number sequence different from that of the PRS. The DRS may use a sequence calculation method different from that of the PRS. The DRS may be arranged on the frequency in a period of a subcarrier different from that of the PRS. The DRS may be arranged in an OFDM symbol different from that of the PRS. The DRS may be arranged with a bandwidth different from that of the PRS, or may be arranged with a bandwidth configured in a higher layer to be transmitted in a narrow band.

One example of a configuration of the DRS will be described.

FIG. 10 illustrates one example of the configuration of the DRS. A signal of the DRS is generated by using a pseudo-random number sequence. The pseudo-random number sequence is, for example, a Gold sequence. The pseudo-random number sequence is calculated based on information from a higher layer. The pseudo-random number sequence is calculated based on a cell ID when information from a higher layer is not configured. The pseudo-random number sequence is calculated based on a type of CP. The pseudo-random number sequence is calculated based on a slot number and an OFDM symbol number in a slot. A resource element in which the DRS is arranged is defined by a configuration number (DRS configuration) and calculated by using a table of FIG. 12. In the table, k' denotes a subcarrier number, l' denotes an OFDM symbol number, $n_s$ denotes a slot number, and $n_s$ mod 2 denotes a slot number. For example, in the case of a configuration number 0, the DRS is arranged in resource elements of a slot number 0, a subcarrier number 9, and OFDM symbol numbers 5 and 6. The DRS is transmitted in a broadband with a bandwidth configured in downlink.

Note that, the DRS may use a pseudo-random number sequence different from that of the CSI-RS. The DRS may use a sequence calculation method different from that of the CSI-RS. Without limitation to the table of FIG. 12, the DRS is able to be arranged in a resource element different from that of the CSI-RS. The DRS may be arranged with a bandwidth different from that of the CSI-RS, or may be arranged with a bandwidth configured in a higher layer to be transmitted in a narrow band.

One example of a configuration of the DRS will be described.

FIG. 10 illustrates one example of the configuration of the DRS. A resource element in which the DRS is arranged is defined by a configuration number (DRS configuration) and calculated by using the table of FIG. 12. In the table, k' denotes a subcarrier number, l' denotes an OFDM symbol number, $n_s$ denotes a slot number, and $n_s$ mod 2 denotes a slot number. For example, in the case of a configuration number 0, the DRS is arranged in resource elements of a slot number 0, a subcarrier number 9, and OFDM symbol numbers 5 and 6. The DRS is transmitted in a broadband with a bandwidth configured in downlink. The DRS may be transmitted with zero power in the configured resource element. In other words, the DRS does not transmit a signal in the configured resource element.

Note that, without limitation to the table of FIG. 12, the DRS is able to be arranged in a resource element different from that of the CSI-IM. The DRS may be arranged with a bandwidth different from that of the CSI-IM, or may be arranged with a bandwidth configured in a higher layer to be transmitted in a narrow band.

Though the configurations of the DRS have been described as above, without limitation to the aforementioned examples, the DRS is constituted by combination of the examples.

One example of preferable combinations is cited. The DRS is configured by a combination of a signal constituted by the Zadoff-Chu sequence, a signal constituted based on the M-sequence, and a signal constituted based on the Gold sequence. The signal constituted based on the Gold sequence is constituted in a broadband compared to the signal constituted by of the Zadoff-Chu sequence, the signal constituted by the Zadoff-Chu sequence is transmitted with use of six resource blocks, and the signal constituted based on the Gold sequence is transmitted in an entire band of a subframe.

One example of preferable combinations is cited. The DRS is configured by a combination of a signal constituted by the Zadoff-Chu sequence, a signal constituted based on the M-sequence, and a signal constituted based on the Gold sequence, and a signal transmitted with zero power. The signal constituted based on the Gold sequence and the signal transmitted with zero power specify resource elements based on a configuration information on the DRS. The signal constituted based on the Gold sequence is configured in a broadband compared to the signal constituted by the Zadoff-Chu sequence, the signal constituted by the Zadoff-Chu sequence is transmitted with use of six resource blocks, and the signal constituted based on the Gold sequence is transmitted in an entire band of a subframe.

A configuration of the DRS is notified to the terminal device by dedicated RRC signaling. The configuration of the DRS includes information shared between cells in which the RS is transmitted and information on each cell in which the DRS is transmitted. Note that, the configuration of the DRS may be notified being included in configuration information on a measurement object described below.

The information shared between cells in which the DRS is transmitted includes information on a center frequency of a band, information on a bandwidth, information on a subframe, and the like.

The information on each cell in which the DRS is transmitted includes information on a center frequency of a band, information on a bandwidth, information on a subframe, information for designating a resource element, information for specifying a cell (cell ID, PCI), and the like.

With the configuration of the DRS, the terminal device is able to recognize the subframe including the DRS and thus does not need to perform detection processing of the DRS in a subframe not including the DRS. This makes it possible to reduce power consumption of the terminal device.

Differences between the CRS and the DRS will be described below.

The CRS is arranged in all subframes other than MBSFN subframes. On the other hand, the DRS is arranged periodically in a subframe period which is configured.

Thereby, the DRS has a low density of resource elements on the time axis and is able to suppress inter-cell interference compared to the CRS.

In the CRS, a resource element and a signal sequence are determined based on the physical cell identity (PCI). On the other hand, in the DRS, a resource element and a signal sequence are determined based on a parameter other than the physical cell identity (PCI). Examples of the parameter other than the physical cell identity (PCI) include CGI, extended cell ID, DRS configuration index, and the like.

Thereby, the DRS is able to be transmitted with more types than the physical cell identity (PCI), and is therefore suitable for cell detection/identification in an environment where many cells are dense.

Details of measurement of a physical layer will be described below. The terminal device performs measurement of a physical layer to be reported to a higher layer. As the measurement of the physical layer, there are RSRP (Reference Signal Received Power), RSSI (Received Signal Strength Indicator), RSRQ (Reference Signal Received Quality), and the like.

Details of the RSRP will be described below. The RSRP is defined as receive power of a reference signal.

One example of the RSRP will be described.

The RSRP is defined as a value obtained by linearly averaging power of resource elements in which the CRS included in a considered measurement frequency bandwidth is transmitted. A resource element in which the CRS of an antenna port 0 is mapped is used to determine the RSRP. When the terminal device is able to detect the CRS of an antenna port 1, a resource element in which the CRS of the antenna port 1 is mapped is also able to be used to determine the RSRP in addition to the resource element in which the CRS of the antenna port 0 is mapped. Hereinafter, the RSRP calculated by using the resource element in which the CRS of the antenna port 0 is mapped is referred to as a CRS-based RSRP or a first RSRP.

The terminal device measures the RSRP of an intra-frequency cell and/or an inter-frequency cell in an RRC idle (RRC_IDLE) state. In this case, the intra-frequency cell in the RRC idle state is a cell having the same frequency band as that of a cell in which system information is received with broadcast by the terminal device. The inter-frequency cell in the RRC idle state is a cell having a frequency band different from that of a cell in which system information is received with broadcast by the terminal device. The terminal device measures the RSRP of an intra-frequency cell and/or an inter-frequency cell in an RRC connected (RRC_CONNECTED) state. In this case, the intra-frequency cell in the RRC connected state is a cell having the same frequency band as that of a cell in which system information is received with RRC signaling or broadcast by the terminal device. The inter-frequency cell in the RRC connected state is a cell having a frequency band different from that of a cell in which system information is received with RRC signaling broadcast by the terminal device.

One example of the RSRP will be described.

The RSRP is defined as a value obtained by linearly averaging power of resource elements in which the CSI-RS included in a considered measurement frequency bandwidth is transmitted. A resource element in which the CSI-RS is mapped is used to determine the RSRP. The resource element and the antenna port by which the CSI-RS is transmitted are notified in a higher layer. Hereinafter, the RSRP calculated by using a resource element different from the resource element used for the first RSRP is referred to as a RSRP or a second RSRP.

The terminal device measures the RSRP of the intra-frequency cell and/or the inter-frequency cell in the RRC connected (RRC_CONNECTED) state.

One example of the RSRP will be described.

The RSRP is defined as a value obtained by linearly averaging power of resource elements in which the PSS included in a considered measurement frequency bandwidth is transmitted. A resource element in which the PSS is mapped is used to determine the RSRP.

The terminal device measures the RSRP of the intra-frequency cell and/or the inter-frequency cell in the RRC idle (RRC_IDLE) state. Moreover, the terminal device measures the RSRP of the intra-frequency cell and/or the inter-frequency cell in the RRC connected (RRC_CONNECTED) state.

One example of the RSRP will be described.

The RSRP is defined as a value obtained by linearly averaging power of resource elements in which the PSS and the SSS included in a considered measurement frequency bandwidth are transmitted. A resource element in which the PSS and the SSS are mapped is used to determine the RSRP.

The terminal device measures the RSRP of the intra-frequency cell and/or the inter-frequency cell in the RRC idle (RRC_IDLE) state. Moreover, the terminal device measures the RSRP of the intra-frequency cell and/or the inter-frequency cell in the RRC connected (RRC_CONNECTED) state.

One example of the RSRP will be described.

The RSRP is defined as a value obtained by linearly averaging power of resource elements in which the DRS included in a considered measurement frequency bandwidth is transmitted. A resource element in which the DRS is mapped is used to determine the RSRP. The resource element and the antenna port by which the DRS is transmitted are notified in a higher layer.

The terminal device measures the RSRP of the intra-frequency cell and/or the inter-frequency cell in the RRC connected (RRC_CONNECTED) state.

One example of the RSRP will be described.

The RSRP is defined as a value obtained by linearly averaging power of resource elements in which the CRS or the DRS included in a considered measurement frequency bandwidth is transmitted. To determine the RSRP, a resource element in which the DRS is mapped is used when a configuration from a higher layer is performed, and a resource element in which the CRS of the antenna port 0 is mapped is used when the configuration is not performed from a higher layer. In a case where the terminal device is able to detect the CRS of the antenna port 1 when the configuration is not performed from a higher layer, a resource element in which the CRS of the antenna port 1 is mapped is also able to be used to determine the RSRP in addition to the resource element in which the CRS of the antenna port 0 is mapped. The resource element and the antenna port by which the DRS is transmitted are notified in the higher layer.

Here, one example of the configuration from the higher layer includes whether or not a configuration of the DRS (DRS-Config) is performed.

Alternatively, as one example of the configuration from the higher layer, a measurement result to be reported is configured in association with a parameter to be designated. For example, the configuration is performed in association with a new parameter (report Quantity) included in a report configuration (report Config).

One example of the RSRP will be described.

The RSRP is defined as a value obtained by linearly averaging power of resource elements in which the CRS or the DRS included in a considered measurement frequency bandwidth is transmitted. To determine the RSRP, a resource element in which the DRS is mapped is used when information indicating a stop state of a target cell is received, and a resource element in which the CRS of the antenna port 0 is mapped is used when information indicating a start-up state of a target cell is received. In a case where the terminal device is able to detect the CRS of the antenna port 1 when the information indicating the start-up state of the target cell is received, a resource element in which the CRS of the antenna port 1 is mapped is also able to be used to determine the RSRP in addition to the resource element in which the CRS of the antenna port 0 is mapped. The resource element and the antenna port by which the DRS is transmitted are notified in a higher layer.

The terminal device measures the RSRP of the intra-frequency cell and/or the inter-frequency cell in the RRC connected (RRC_CONNECTED) state.

One example of the RSRP will be described.

The RSRP is defined as a value obtained by linearly averaging power of resource elements in which the CRS or the DRS included in a considered measurement frequency bandwidth is transmitted. To determine the RSRP, a resource element in which the DRS is mapped is used when the DRS is detected, and a resource element in which the CRS of the antenna port 0 is mapped is used when the DRS is not detected. In a case where the terminal device is able to detect the CRS of the antenna port 1 when the configuration is not performed from a higher layer, a resource element in which the CRS of the antenna port 1 is mapped is also able to be used to determine the RSRP in addition to the resource element in which the CRS of the antenna port 0 is mapped. The resource element and the antenna port by which the DRS is transmitted are notified in a higher layer.

A reference as to whether or not the DRS is detected is, for example, comparison of receive power of the resource element in which the DRS is mapped to a reference value.

The reference as to whether or not the DRS is detected is, for example, comparison of receive power of the resource element in which the DRS is mapped to receive power of the resource element in which the CRS of the antenna port 0 is mapped.

Note that, when the DRS is not transmitted in the start-up state, a cell to be measured switches a type of the RSRP between the start-up state and the stop state.

Details of the RSSI will be described below. The RSSI is defined by total receive power observed by using a receive antenna.

One example of the RSSI will be described.

The RSSI (E-UTRA carrier RSSI) is formed by a value obtained by linearly averaging total receive power obtained from observation of only OFDM symbols assumed to include a reference signal to the antenna port 0. In other words, the RSSI is formed by a value obtained by linearly averaging total receive power obtained from observation of only OFDM symbols assumed to include the CRS of the antenna port 0. The RSSI is observed in a bandwidth of N resource blocks. The total receive power of the RSSI includes power from a serving cell or a non-serving cell of the same channel, interfering power from an adjacent channel, thermal noise power, and the like.

One example of the RSSI will be described.

The RSSI (E-UTRA carrier RSSI) is formed by a value obtained by linearly averaging total receive power obtained from observation of all OFDM symbols. The total receive power of the RSSI includes power from a serving cell or a non-serving cell of the same channel, interfering power from an adjacent channel, thermal noise power, and the like.

One example of the RSSI will be described.

The RSSI (E-UTRA carrier RSSI) is formed by a value obtained by linearly averaging total receive power obtained from observation of only resource elements including the DRS. The RSSI is observed in a bandwidth of N resource blocks. The total receive power of the RSSI includes power from a serving cell or a non-serving cell of the same channel, interfering power from an adjacent channel, thermal noise power, and the like. The resource element and the antenna port by which the DRS is transmitted are notified in a higher layer.

Here, the RSSI may be measured by using the resource element in which the signal of the DRS is transmitted. In this case, the resource element calculated by the second RSRP is the same as the resource element of the RSSI. Arrangement information of the resource element in which the DRS is transmitted is configured to the terminal device.

Moreover, the RSSI may be measured by using the resource element of the DRS to be transmitted with zero power. In this case, the resource element calculated by the second RSRP is different from the resource element of the RSSI. Both of arrangement information of the resource element for calculating the second RSRP and arrangement information of the resource element for calculating the RSSI are configured to the terminal device.

Details of the RSRQ will be described below. The RSRQ is defined by a ratio of the RSRP and the RSSI and is used for the purpose equivalent to a signal to interference noise ratio (SINR) of a cell to be measured, which is an index of communication quality. Though a combination of the RSRP and the RSSI is not limited to the following, a preferable combination of the RSRP and the RSSI in the present embodiment will be described.

One example of the RSRQ will be described.

The RSRQ is defined as a ratio calculated with a formula of N×RSRP/RSSI. In the formula, N denotes the number of resource blocks of a measurement bandwidth of the RSSI, and a numerator and a denominator of the RSRQ need to be constituted by the same set of resource blocks. In the formula, the RSRP is the first RSRP. The RSRQ calculated by using the RSRQ calculated with the first RSRP is referred to as CRS-based RSRQ or first RSRQ.

The RSSI (E-UTRA carrier RSSI) is formed by a value obtained by linearly averaging total receive power obtained from observation of only OFDM symbols including a reference signal to the antenna port 0. In other words, the RSSI is formed by a value obtained by linearly averaging total receive power obtained from observation of only OFDM symbols including the CRS of the antenna port 0. The RSSI is observed in a bandwidth of N resource blocks. The total receive power of the RSSI includes power from a serving cell or a non-serving cell of the same channel, interfering power from an adjacent channel, thermal noise power, and the like. When a predetermined subframe for performing measurement of the RSRQ is designated from signaling of a higher layer, the RSSI is measured from all OFDM symbols in the designated subframe.

The terminal device measures the RSRQ of an intra-frequency cell and/or an inter-frequency cell in the RRC idle state. The terminal device measures the RSRQ of an intra-frequency cell and/or an inter-frequency cell in the RRC connected state.

One example of the RSRQ will be described.

The RSRQ is defined as a ratio calculated with a formula of N×RSRP/RSSI. In the formula, N denotes the number of resource blocks of a measurement bandwidth of the RSSI, and a numerator and a denominator of the RSRQ need to be constituted by the same set of resource blocks. In the formula, the RSRP is the second RSRP. The RSRQ calculated by using the RSRQ calculated with the second RSRP is referred to as a second RSRQ.

The RSSI (E-UTRA carrier RSSI) is formed by a value obtained by linearly averaging total receive power obtained from observation of only OFDM symbols assumed to include a reference signal to the antenna port 0. In other words, the RSSI is formed by a value obtained by linearly averaging total receive power obtained from observation of only OFDM symbols including the CRS of the antenna port 0. The RSSI is observed in a bandwidth of N resource blocks. The total receive power of the RSSI includes power from a serving cell or a non-serving cell of the same channel, interfering power from an adjacent channel, thermal noise power, and the like. When a predetermined subframe for performing measurement of the RSRQ is designated from signaling of a higher layer, the RSSI is measured from all OFDM symbols in the designated subframe.

The terminal device measures the RSRQ of the intra-frequency cell and/or the inter-frequency cell in the RRC connected state.

One example of the RSRQ will be described.

Though each example of the RSRQ has been described above, a definition of the RSRQ may change depending on the situation. For example, accuracy of the RSSI varies greatly between the start-up state and the stop state.

The RSRQ is defined as a ratio calculated with a formula of N×RSRP/(RSSI+N×RSRP) when a target cell is in the stop state and calculated with a formula of N× RSRP/RSSI when the target cell is in the start-up state. In the formulas, N denotes the number of resource blocks of a measurement bandwidth of the RSSI, and a numerator and a denominator of the RSRQ need to be constituted by the same set of resource blocks. In the formulas, the RSRP is the second RSRP.

The RSSI (E-UTRA carrier RSSI) is formed by a value obtained by linearly averaging total receive power obtained from observation of only OFDM symbols assumed to include a reference signal to the antenna port 0. In other words, the RSSI is formed by a value obtained by linearly averaging total receive power obtained from observation of only OFDM symbols including the CRS of the antenna port 0. The RSSI is observed in a bandwidth of N resource blocks. The total receive power of the RSSI includes power from a serving cell or a non-serving cell of the same channel, interfering power from an adjacent channel, thermal noise power, and the like. When a predetermined subframe for performing measurement of the RSRQ is designated from signaling of a higher layer, the RSSI is measured from all OFDM symbols in the designated subframe.

One example of the RSRQ will be described.

The RSRQ is defined as a ratio calculated with a formula of N×RSRP/RSSI. In the formula, N denotes the number of resource blocks of a measurement bandwidth of the RSSI, and a numerator and a denominator of the RSRQ need to be constituted by the same set of resource blocks. In the formula, the RSRP is the second RSRP.

The RSSI (E-UTRA carrier RSSI) is formed by a value obtained by linearly averaging total receive power obtained from observation of only resource elements including the DRS. The RSSI is observed in a bandwidth of N resource blocks. The total receive power of the RSSI includes power from a serving cell or a non-serving cell of the same channel, interfering power from an adjacent channel, thermal noise power, and the like. When a predetermined subframe for performing measurement of the RSRQ is designated from signaling of a higher layer, the RSSI is measured from the designated subframe. The resource element and the antenna port by which the DRS is transmitted are notified in a higher layer.

One example of the RSRQ will be described.

Though each example of the RSRQ has been described above, a definition of the RSRQ may change depending on the situation. For example, accuracy of the RSSI varies greatly between the start-up state and the stop state.

The RSRQ is defined as a ratio calculated with a formula of N×RSRP/(RSSI+N×RSRP) when a configuration from a higher layer is performed and calculated with a formula of N×RSRP/RSSI when the configuration is not performed from a higher layer. In the formulas, N denotes the number of resource blocks of a measurement bandwidth of the RSSI, and a numerator and a denominator of the RSRQ need to be constituted by the same set of resource blocks. In the formulas, the first RSRP or the second RSRP is used for the RSRP based on the configuration from the higher layer.

The RSSI (E-UTRA carrier RSSI) is formed by a value obtained by linearly averaging total receive power obtained from observation of only OFDM symbols assumed to include a reference signal to the antenna port 0. In other words, the RSSI is formed by a value obtained by linearly averaging total receive power obtained from observation of only OFDM symbols including the CRS of the antenna port 0. The RSSI is observed in a bandwidth of N resource blocks. The total receive power of the RSSI includes power from a serving cell or a non-serving cell of the same channel, interfering power from an adjacent channel, thermal noise power, and the like. When a predetermined subframe for performing measurement of the RSRQ is designated from signaling of the higher layer, the RSSI is measured from all OFDM symbols in the designated subframe.

Here, one example of the configuration from the higher layer includes whether or not a configuration of the DRS (DRS-Config) is performed.

Alternatively, as one example of the configuration from the higher layer, a measurement result to be reported is configured in association with a parameter to be designated. For example, the configuration is performed in association with a new parameter (report Quantity) included in a report configuration (report Config).

One example of DL RS TX power (Downlink reference signal transmit power) will be described.

The DL RS TX power is determined as a value obtained by linearly averaging power of resource elements delivering the CRS transmitted by a base station device which operates a system bandwidth.

One example of the DL RS TX power will be described.

The DL RS TX power is determined as a value obtained by linearly averaging power of resource elements delivering the DRS transmitted by the base station device which operates the system bandwidth.

First measurement procedure will be described. The first measurement is measurement of the first RSRP and the first RSRQ.

The terminal device recognizes the resource element, in which the CRS transmitted by the antenna port 0 is arranged, from the physical cell identity (PCI). The terminal device then measures the first RSRP from the resource element in which the CRS transmitted by the antenna port 0 is arranged. Note that, the number of subframes used for the measurement is not limited, and the measurement may be performed over a plurality of subframes to report an average value. Next, the terminal device recognizes the OFDM symbol in which the antenna port 0 is included and measures the RSSI. Then, the terminal device calculates the first RSRQ from the first RSRP and the RSSI. Note that, subframes used for the measurement of the first RSRP and the RSSI may be different.

Hereinafter, a result obtained based on the first measurement procedure (first RSRP, first RSRQ) is referred to as a first measurement result.

Second measurement procedure will be described. The second measurement is measurement of the second RSRP and the second RSRQ.

The terminal device recognizes the resource element, in which the DRS is arranged, from configuration information on the DRS. The terminal device then measures the second RSRP from the resource element in which the DRS is arranged. Note that, the number of subframes used for the measurement is not limited, and the measurement may be performed over a plurality of subframes to report an average value. Next, the terminal device measures the RSSI. Then, the terminal device calculates the second RSRQ from the second RSRP and the RSSI.

Hereinafter, a result obtained based on the second measurement procedure (second RSRP, second RSRQ) is referred to as a second measurement result.

Differences between the first RSRP/RSRQ and the second RSRP/RSRQ will be described below.

The first RSRP/RSRQ is measured based on the CRS. On the other hand, the second RSRP/RSRQ is measured based on the RS other than the CRS. An example of the RS other than the CRS includes the DRS.

Thereby, a base station device to which the CRS is not transmitted is also able to measure the RSRP/RSRQ.

The first RSRP may be measured by using any subframe. On the other hand, since the second RSRP is measured based on the RS arranged periodically, a subframe for measurement is implicitly designated. Specifically, the second RSRP is measured based on information on the subframe in which the RS is arranged, which is notified from the base station device.

Thereby, the terminal device does not need to perform monitoring for measurement in all subframes, thus making it possible to reduce power consumption.

The physical cell identity is required to measure the first RSRP/RSRQ. On the other hand, information other than the physical cell identity is also required to measure the second RSRP. Other information is configuration information on the RS, and examples thereof include information for notifying the resource element in which the RS is arranged and information for notifying the number of antenna ports used for measurement.

Since the first RSRP/RSRQ is able to be measured when the terminal device recognizes the physical cell identity, the measurement is performed in the RRC idle state and the RRC connected state. On the other hand, with respect to the second RSRP/RSRQ, the terminal device needs also information other than the physical cell identity and other information is notified by RRC signaling, so that the measurement is performed only in the RRC connected state.

The terminal device of the present embodiment is a terminal device communicating with a base station device, including: a reception unit which performs first measurement based on a first RS (CRS) and performs second measurement based on a second RS (DRS); and a higher layer processing unit which reports a result of the first measurement and a result of the second measurement to the base station device, in which the first measurement is performed in a first state and the first measurement or the second measurement is performed in a second state. Both of the first measurement and the second measurement may be performed in the second state, and only the second measurement may be performed in the second state.

As one example, the first state is a state where configuration information on the second RS is not notified and the second state is a state where configuration information on the second RS is notified from the base station device. Further, as one example, the first state is a state where information on the second measurement is not configured and the second state is a state where information on the second measurement is configured from the base station device. In addition, as one example, the second state is a state where the first RS is not transmitted.

The terminal device of the present embodiment is a terminal device communicating with a base station device, including: a reception unit which performs first measurement when a predetermined cell is in a first state and performs second measurement when the predetermined cell is in a second state; and a higher layer processing unit which reports the first measurement and the second measurement to the base station device, in which the first measurement and the second measurement are switched based on information indicating the first state/the second state of the predetermined cell.

As one example, the information indicating the first state/the second state of the predetermined cell is notified from the base station device. Further, as one example, the information indicating the first state/the second state of the predetermined cell is notified by a change of a configuration of a RS transmitted from the predetermined cell.

As one example, calculation is performed with a calculation formula of a first RSRQ in the first measurement and calculation is performed with a calculation formula of a second RSRQ in the second measurement. Further, as one example, the first measurement is performed based on a CRS and the second measurement is performed based on a RS different from the CRS.

A mechanism for reporting (transferring) a measurement value obtained by measurement of the terminal device to a higher layer will be described below.

Figure 13:
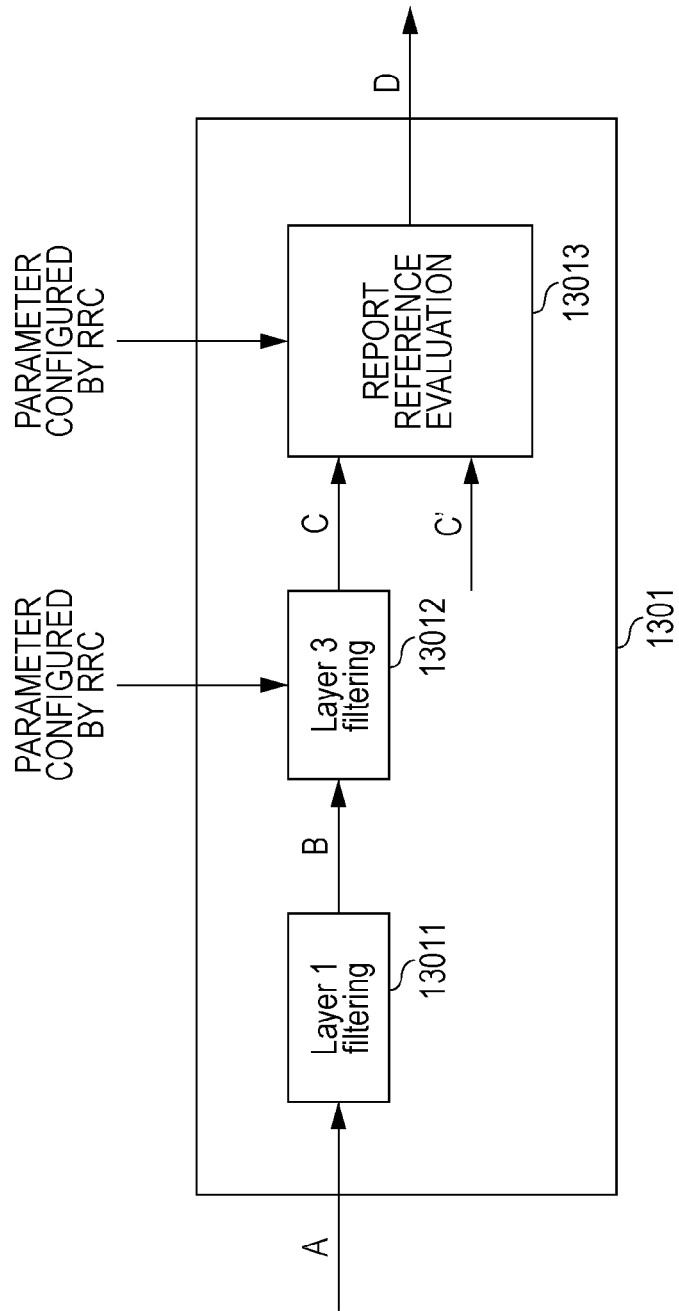
FIG. 13 illustrates a model of measurement.

A model of measurement will be described. FIG. 13 illustrates a model of measurement.

A measurement unit 1301 includes a layer 1 filtering unit 13011, a layer 3 filtering unit 13012, and a report reference evaluation unit 13013. Note that, the measurement unit 1301 includes a part of functions of the reception unit 105 and the higher layer processing unit 101. Specifically, the layer 1 filtering 13011 is included in the reception unit 105, and the layer 3 filtering 13012 and the report reference evaluation 13013 are included in the higher layer processing unit 101.

A measurement value (sample) input from a physical layer is filtered by the layer 1 filtering unit 13011. To the layer 1 filtering unit 13011, for example, an average of a plurality of input values, a weighted average, an average following channel characteristics, and the like are applied, or other filtering methods may be applied. The measurement value reported from a layer 1 is input to the layer 1 filtering unit 13011 and then to a layer 3. The measurement value input to the layer 3 filtering unit 13012 is filtered. A configuration of the layer 3 filtering is provided from RRC signaling. A period in which filtering by the layer 3 filtering unit 13012 is performed and a report is performed is the same as an input measurement period. The report reference evaluation unit 13013 checks whether the report of the measurement value is actually required. An evaluation is based on one or more measurement flows. An example thereof includes comparison between different measurement values. The terminal device performs evaluation of a report reference each time at least a new measurement result is reported. A configuration of the report reference is provided by RRC signaling. After it is judged that the report of the measurement value is required by the evaluation of the report reference, the terminal device transmits measurement report information (measurement report message) by radio interface.

Next, description will be given for measurement. The base station device transmits a measurement configuration message to the terminal device by using an RRC connection reconfiguration message of RRC signaling (radio resource control signal). The terminal device configures system information included in the measurement configuration message and performs measurement, event evaluation, and measurement report for a serving cell and a neighbour cell (including a listed cell and/or a detected cell) in accordance with the notified system information. The listed cell is a cell listed in a measurement object (cells notified in a neighbour cell list from the base station device to the terminal device) and the detected cell is a cell detected by the terminal device on frequency indicated by a measurement object and not listed in the measurement object (cells detected by the terminal device itself and not notified in the neighbour cell list).

There are three types of measurements (intra-frequency measurements, inter-frequency measurements, and inter-radio access technology measurements (inter-RAT measurements)). The intra-frequency measurements mean measurements at a downlink frequency of the serving cell (downlink frequency). The inter-frequency measurements mean measurements at a frequency different from the downlink frequency of the serving cell. The inter-radio access technology measurements (inter-RAT measurements) mean measurements with a wireless technology (e.g., UTRA, GERAN, or CDMA2000) different from the wireless technology of the serving cell (e.g., EUTRA).

The measurement configuration message includes addition and/or modification and/or deletion of configurations of a measurement identity (meas Id), measurement objects, and reporting configurations, and a quantity configuration (quantity Config), a measurement gap configuration (meas Gap Config), a serving cell quality threshold (s-Measure), and the like.

The quantity configuration (quantity Config) specifies a layer 3 filtering coefficient (L3 filtering coefficient) when the measurement object is EUTRA. The layer 3 filtering coefficient (L3 filtering coefficient) prescribes a ratio (rate) between the latest measurement result and a previous filtering measurement result. The filtering result is utilized for the event evaluation in the terminal device.

The measurement gap configuration (meas Gap Config) is utilized for controlling a configuration of a measurement gap pattern and activation/deactivation of a measurement gap. In the measurement gap configuration (meas Gap Config), a gap pattern, a start system frame number (start SFN), and a start subframe number are notified as information in the case of activating the measurement gap. The gap pattern prescribes which pattern is used as the measurement gap. The start system frame number (start SFN) prescribes SFN (System Frame Number) for starting the measurement gap. The start subframe number prescribes a subframe number for starting the measurement gap.

The serving cell quality threshold (s-Measure) represents a threshold related to quality of a serving cell and is utilized for controlling whether or not the terminal device needs to perform measurement. The serving cell quality threshold (s-Measure) is configured as a value for the RSRP.

The measurement identity (meas Id) is utilized for linking the measurement objects with the reporting configurations and specifically links a measurement object identity (meas Object Id) with a reporting configuration identity (report Config Id). The measurement identity (meas Id) is associated with one measurement object identity (meas Object Id) and one reporting configuration identity (report Config Id). The measurement configuration message is able to be added/modified/deleted in terms of relationships with the measurement identity (meas Id), the measurement objects, and the reporting configurations.

Meas Object To Remove List is a command for deleting a specified measurement object identity (meas Object Id) and measurement objects corresponding to the specified measurement object identity (meas Object Id). In this case, all the measurement identities (meas Id) associated with the specified measurement object identity (meas Object Id) are deleted. This command is able to specify a plurality of measurement object identities (meas Object Id) at the same time.

Meas Object To Add Modify List is a command for modifying a specified measurement object identity (meas Object Id) for specified measurement objects or for adding a specified measurement object identity (meas Object Id) and specified measurement objects. This command is able to specify a plurality of measurement object identities (meas Object Id) at the same time.

Report Config To Remove List is a command for deleting a specified reporting configuration identity (report Config Id) and reporting configurations corresponding to the specified reporting configuration identity (report Config Id). In this case, all the measurement identities (meas Id) associated with the specified reporting configuration identity (report Config Id) are deleted. This command is able to specify a plurality of reporting configuration identities (report Config Id) at the same time.

Meas Id To Remove List is a command for deleting a specified measurement identity (meas Id). In this case, the measurement object identity (meas Object Id) and the reporting configuration identity (report Config Id) associated with the specified measurement identity (meas Id) are not deleted and are maintained. This command is able to specify a plurality of measurement identities (meas Id) at the same time.

Meas Id To Add Modify List is a command for modifying a specified measurement identity (meas Id) to be associated with a specified measurement object identity (meas Object Id) and a specified reporting configuration identity (report Config Id) or for associating a specified measurement object identity (meas Object Id) and a specified reporting configuration identity (report Config Id) with a specified measurement identity (meas Id) to add the specified measurement identity (meas Id). This command is able to specify a plurality of measurement identities (meas Id) at the same time.

The measurement objects are prescribed for each radio access technology (RAT) and each frequency. The reporting configurations include prescriptions for EUTRA and prescriptions for RAT other than EUTRA.

The measurement objects include a measurement object EUTRA (meas Object EUTRA) associated with a measurement object identity (meas Object Id).

The measurement object identity (meas Object Id) is an identity used for identifying the configuration of the measurement objects. The configuration of the measurement objects is prescribed for each radio access technology (RAT) and frequency as described above. The measurement objects are separately specified for EUTRA, UTRA, GERAN, and CDMA2000. The measurement object EUTRA (meas Object EUTRA), which is a measurement object for EUTRA, prescribes information applied to neighbour cells of EUTRA. In the measurement object EUTRA (meas Object EUTRA), one having a different frequency is handled as a different measurement object and is separately allocated with a measurement object identity (meas Object Id).

One example of information on a measurement object will be described.

The measurement object EUTRA (meas Object EUTRA) includes EUTRA carrier frequency information (eutra-Carrier Info), a measurement bandwidth (measurement Bandwidth), antenna port 1 presence information (presenceAntennaPort1), an offset frequency (offset Freq), information related to a neighbour cell list, and information related to a black list.

Next, information included in the measurement object EUTRA (meas Object EUTRA) will be described. The EUTRA carrier frequency information (eutra-Carrier Info) specifies a carrier frequency to be a measurement object. The measurement bandwidth (measurement Bandwidth) indicates a measurement bandwidth common to all the neighbour cells operating in the carrier frequency to be the measurement object. The antenna port 1 presence information (presenceAntennaPort1) indicates whether or not the antenna port 1 is used in a cell to be the measurement object. The offset frequency (offset Freq) indicates a measurement offset value applied to the frequency to be the measurement object.

One example of information on the measurement object will be described.

A configuration different from that of the first measurement is performed to perform the second measurement.

The measurement object EUTRA (meas Object EUTRA) includes EUTRA carrier frequency information (eutra-Carrier Info), a measurement bandwidth (measurement Bandwidth), DRS configuration information (DS configuration information, discovery signal measurement configuration information), an offset frequency (offset Freq), information related to a neighbour cell list, and information related to a black list.

Next, information included in the measurement object EUTRA (meas Object EUTRA) will be described. The EUTRA carrier frequency information (eutra-Carrier Info) specifies a carrier frequency to be a measurement object. The measurement bandwidth (measurement Bandwidth) indicates a measurement bandwidth common to all the neighbour cells operating in the carrier frequency to be the measurement object. The DRS configuration information is used to notify the terminal device of configuration information common in a frequency band required to detect the DRS configuration, and indicates, for example, a subframe number and a subframe period for transmission in a cell to be the measurement object. The offset frequency (offset Freq) indicates a measurement offset value applied to the frequency to be the measurement object.

One example of information related to a neighbour cell list and a black list will be described.

The information related to the neighbour cell list includes information related to neighbour cells that are to be objects of the event evaluation and the measurement report. The information related to the neighbour cell list includes a physical cell identity (physical cell ID), a cell individual offset (cell Individual Offset; indicting a measurement offset value applied to a neighbour cell), and the like. In the case of EUTRA, this information is utilized as information for performing addition, modification, or deletion in the neighbour cell list already acquired by the terminal device from broadcast information (broadcasted system information).

The information related to the black list includes information related to neighbour cells that are not to be objects of the event evaluation or the measurement report. The information related to the black list includes a physical cell identity (physical cell ID) and the like. In the case of EUTRA, this information is utilized as information for performing addition, modification, or deletion in the black cell list (black listed cell list) already acquired by the terminal device from broadcast information.

One example of information related to a neighbour cell list and a black list will be described.

When the second measurement is performed, usage in a case where a physical cell identity (PCI) is insufficient is assumed. Thus, a new neighbour cell list and a new black list in which the physical cell identity is extended are required.

Information related to the new neighbour cell list (neighbour small cell list) includes information related to neighbour cells that are to be objects of the event evaluation and the measurement report. The information related to the new neighbour cell list includes a cell ID, a cell individual offset (cell Individual Offset; indicting a measurement offset value applied to a neighbour cell), cell individual DRS configuration information, and the like. The cell individual DRS configuration information is DRS information that is cell-specifically configured, and an example thereof includes information indicating a resource element of the DRS to be used. In the case of EUTRA, the information is utilized as information for performing addition, modification, or deletion in the new neighbour cell list already acquired by the terminal device from broadcast information (broadcasted system information).

The information related to the new black list includes information related to neighbour cells that are not to be objects of the event evaluation or the measurement report. The information related to the new black list includes a cell ID and the like. In the case of EUTRA, this information is utilized as information for performing addition, modification, or deletion in the new black cell list (black listed small cell list) already acquired by the terminal device from broadcast information.

In this case, the cell ID is, for example, a physical cell identity (physical cell ID), CGI (Cell Global Identity), or a discovery ID, and is formed based on information on cell (transmission point) ID, which is transmitted by the DRS.

Details of the layer 3 filtering (Layer 3 filtering) will be described below.

The terminal device filters a measurement result with a following formula before using for the evaluation of the report reference and the report of the measurement.

$$F_n = (1-\alpha) \times F_{n-1} + \alpha \times M_n$$

In the formula, $M_n$ denotes a latest measurement result received from a physical layer, $F_n$ denotes an updated measurement result after the filter, which is used for the evaluation of the report reference or the report of the measurement, and $F_{n-1}$ denotes a measurement result after the previous filtering, and $M_1$ is set to $F_0$ when the first measurement result is received from the physical layer, $\alpha = \frac{1}{2}^{(k/4)}$, and k is a filtering coefficient with respect to a corresponding measurement amount.

By applying the filter, the terminal device keeps time property even for a different period of the input. The filtering coefficient k assumes a sample period which is the same as 200 ms.

When k is set as 0, the layer 3 filtering is not applied.

The filtering is performed with the same domain as a domain used for the evaluation of the report reference or the report of the measurement. For example, filtering of a logarithm is performed for a measurement value of a logarithm.

The period for the input to the filter is able to be configured freely.

When the reported measurement result and the previously reported measurement result are obtained by different measurement methods, the measurement result after the previous filter is reset. As the different measurement methods, for example, there is a case where the reported measurement result $M_n$ is the second measurement result. In this case, the measurement result after the previous filter is reset. That is, $M_n$ is set to $F_{n-1}$. Alternatively, a formula of $F_n = M_n$ is applied instead of the formula of the filter.

Next, details of reporting configurations will be described.

The reporting configurations include reporting configuration EUTRA (report Config EUTRA) corresponding to a reporting configuration identity (report Config Id), and the like.

The reporting configuration identity (report Config Id) is an identity used for identifying the reporting configurations related to the measurement. The reporting configurations related to the measurement include prescriptions for EUTRA and prescriptions for RAT other than EUTRA (UTRA, GERAN, CDMA2000) as described above. The reporting configuration EUTRA (report Config EUTRA) serving as reporting configurations for EUTRA defines triggering criteria of an event utilized for reporting the measurement in EUTRA.

The reporting configuration EUTRA (report Config EUTRA) includes an event identity (event Id), a triggering quantity (trigger Quantity), hysteresis, a time to trigger (time To Trigger), a reporting quantity (report Quantity), a maximum reporting cell number (max Report Cells), a reporting interval (report Interval), and a reporting amount (report Amount).

The event identity (event Id) is utilized for selecting criteria related to event triggered reporting. The event triggered reporting is a method for reporting the measurements when the event triggering criteria are satisfied. In addition, there is also event triggered periodic reporting for reporting the measurement a certain number of times at regular intervals when the event triggering criteria are satisfied.

When the event triggering criteria specified by the event identity (event Id) are satisfied, the terminal device performs the measurement report to the base station device. The triggering quantity (trigger Quantity) is a quantity utilized for evaluating the event triggering criteria. That is, RSRP or RSRQ is specified. In other words, the terminal device utilizes a quantity specified by the triggering quantity (trigger Quantity) to perform the measurement of a downlink reference signal and determines whether or not the event triggering criteria specified by the event identity (event Id) are satisfied. The hysteresis is a parameter utilized in the event triggering criteria. The time to trigger (time To Trigger) indicates a period in which the event triggering criteria are to be satisfied. The reporting quantity (report Quantity) indicates a quantity reported in the measurement report. In this case, a quantity specified by the triggering quantity (trigger Quantity), or the RSRP and the RSRQ are specified. The maximum reporting cell number (max Report Cells) indicates the maximum number of cells included in the measurement report. The reporting interval (report Interval) is utilized for the periodical reporting or the event triggered periodic reporting and the reporting is periodically performed at intervals indicated by the reporting interval (report Interval). The reporting amount (report Amount) prescribes the number of times of the periodical reporting as needed.

Threshold parameters and offset parameters utilized in the event triggering criteria described below are notified to the terminal device together with the event identity (event Id) in the reporting configuration.

The base station device notifies the serving cell quality threshold (s-Measure) in some cases and not in other cases. When the base station device notifies the serving cell quality threshold (s-Measure), the terminal device performs the measurement of a neighbour cell and the event evaluation (whether or not the event triggering criteria are satisfied, also referred to as the evaluation of reporting criteria) when the RSRP of the serving cell is lower than the serving cell quality threshold (s-Measure). On the other hand, when the base station device does not notify the serving cell quality threshold (s-Measure), the terminal device performs the measurement of a neighbour cell and the event evaluation regardless of the RSRP of the serving cell.

Next, details of an event and event triggering criteria will be described.

The terminal device satisfying the event triggering criteria transmits a measurement report to the base station device. The measurement report includes a measurement result.

A plurality of event triggering criteria for performing the measurement report are defined, and each of them has an entering condition and a leaving condition. That is, the terminal device satisfying an entering condition for the event specified by the base station device transmits a measurement report to the base station device. On the other hand, the terminal device satisfying an event entering condition and transmitting a measurement report stops the transmission of the measurement report when satisfying an event leaving condition.

In one example of an event and event triggering criteria described below, either the first measurement result or the second measurement result is used.

One example of the event will be described.

The event is triggered when a measurement result of a serving cell is better than a threshold. When satisfying a condition A1-1, the terminal device performs transmission of a measurement report thereof. When satisfying a condition A1-2, the terminal device stops the transmission of the measurement report.

$Ms-Hys>$Threshold   Entering condition A1-1:

$Ms+Hys<$Threshold   Leaving condition A1-2:

Here, Ms denotes the first measurement result or the second measurement result for the serving cell (a measurement offset value specific to the cell is not considered), Hys denotes a hysteresis parameter for the target event, and Threshold denotes a threshold parameter utilized for the target event.

One example of the event will be described.

The event is triggered when a measurement result of a serving cell is worse than a threshold. When satisfying a condition A2-1, the terminal device performs transmission of a measurement report thereof. When satisfying a condition A2-2, the terminal device stops the transmission of the measurement report.

$Ms-Hys<$Threshold   Entering condition A2-1:

$Ms+Hys>$Threshold   Leaving condition A2-2:

Here, Ms denotes the first measurement result or the second measurement result for the serving cell (a measurement offset value specific to the cell is not considered), Hys denotes a hysteresis parameter for the target event, and Threshold denotes a threshold parameter utilized for the target event.

One example of the event will be described.

The event is triggered when a measurement result of a neighbour cell is better than a measurement result of a primary cell. When satisfying a condition A3-1, the terminal device performs transmission of a measurement report thereof. When satisfying a condition A3-2, the terminal device stops the transmission of the measurement report.

$Mn+Ofn+Ocn-Hys>Mp+Ofp+Ocp+Off$   Entering condition A3-1:

$Mn+Ofn+Ocn+Hys<Mp+Ofp+Ocp+Off$   Leaving condition A3-2:

Here, Mn denotes the first measurement result or the second measurement result for the neighbour cell (a measurement offset value specific to the cell is not considered), Ofn denotes a frequency-specific measurement offset value for a frequency of the neighbour cell, Ocn denotes a cell-specific measurement offset value for the neighbour cell (0 is set when not configured to the neighbour cell), Mp denotes the first measurement result or the second measurement result for the primary cell (a measurement offset value specific to the cell is not considered), Ofp denotes a frequency-specific measurement offset value for a frequency of the primary cell, Ocp denotes a cell-specific measurement offset value for the primary cell (0 is set when not configured to the primary cell), Hys denotes a hysteresis parameter for the target event, and Off denotes an offset parameter utilized for the target event.

One example of the event will be described.

The event is triggered when a measurement result of a neighbour cell is better than a threshold. When satisfying a condition A4-1, the terminal device performs transmission of a measurement report thereof. When satisfying a condition A4-2, the terminal device stops the transmission of the measurement report.

$Mn+Ofn+Ocn-Hys>$Threshold   Entering condition A4-1:

$Mn+Ofn+Ocn+Hys<$Threshold   Leaving condition A4-2:

Here, Mn denotes the first measurement result or the second measurement result for the neighbour cell (a measurement offset value specific to the cell is not considered), Ofn denotes a frequency-specific measurement offset value for a frequency of the neighbour cell, Ocn denotes a cell-specific measurement offset value for the neighbour cell (0 is set when not configured to the neighbour cell), Hys denotes a hysteresis parameter for the target event, and Threshold denotes a threshold parameter utilized for the target event.

One example of the event will be described.

The event is triggered when a measurement result of a primary cell is worse than a threshold 1 and a measurement result of a neighbour cell is better than a threshold 2. When satisfying a condition A5-1 and a condition A5-2, the terminal device performs transmission of a measurement report thereof. When satisfying a condition A5-3 and a condition A5-4, the terminal device stops the transmission of the measurement report.

$Mp-Hys<\text{Threshold 1}$     Entering condition A5-1:

$Mn+Ofn+Ocn-Hys>\text{Threshold 2}$     Entering condition A5-2:

$Mp+Hys>\text{Threshold 1}$     Leaving condition A5-3:

$Mn+Ofn+Ocn+Hys<\text{Threshold 2}$     Leaving condition A5-4:

Here, Mp denotes the first measurement result or the second measurement result for the primary cell (a measurement offset value specific to the cell is not considered), Mn denotes the first measurement result or the second measurement result for the neighbour cell (a measurement offset value specific to the cell is not considered), Ofn denotes a frequency-specific measurement offset value for a frequency of the neighbour cell, Ocn denotes a cell-specific measurement offset value for the neighbour cell (0 is set when not configured to the neighbour cell), Hys denotes a hysteresis parameter for the target event, and each of Threshold 1 and Threshold 2 denotes a threshold parameter utilized for the target event.

One example of the event will be described.

The event is triggered when a measurement result of a secondary cell is better than a measurement result of a neighbour cell. When satisfying a condition A6-1, the terminal device performs transmission of a measurement report thereof. When satisfying a condition A6-2, the terminal device stops the transmission of the measurement report.

$Mn+Ocn-Hys>Ms+Ocs+Off$     Entering condition A6-1:

$Mn+Ocn+Hys<Ms+Ocs+Off$     Leaving condition A6-2:

Here, Mn denotes the first measurement result or the second measurement result for the neighbour cell (a measurement offset value specific to the cell is not considered), Ocn denotes a cell-specific measurement offset value for the neighbour cell (0 is set when not configured to the neighbour cell), Ms denotes the first measurement result or the second measurement result for the serving cell (a measurement offset value specific to the cell is not considered), Ocs denotes a cell-specific measurement offset value for the serving cell (0 is set when not configured to the neighbour cell), Hys denotes a hysteresis parameter for the target event, and Off denotes an offset parameter utilized for the target event.

In each example of the event and the event triggering criteria described above, the event triggering criteria are evaluated by using either the first measurement result or the second measurement result. Thus, it is required to specify which of the first measurement result and the second measurement result is to be used.

One example of a method for specifying a type of the measurement result utilized for evaluating the event triggering criteria will be described below.

By the report configuration, the type of the measurement result utilized for evaluating the event triggering criteria is specified. The event triggering criteria are evaluated by using either the first measurement result or the second measurement result according to a parameter.

As one specific example, the first measurement result or the second measurement result is specified according to a trigger quantity (trigger Quantity). As the trigger quantity, four selection fields of {first RSRP, first RSRQ, second RSRP, and second RSRQ} are prescribed. The terminal device performs measurement of a downlink reference signal by using a quantity specified by the trigger quantity (trigger Quantity) and judges whether or not to satisfy the event triggering criteria specified by the event identity (event Id).

As one specific example, as to whether to be the first measurement result or the second measurement result, a new parameter for specifying the type of the measurement result utilized for evaluating the event triggering criteria (trigger Meas type) is prescribed in addition to the trigger quantity. Information indicating to evaluate the event triggering criteria by using the first measurement result or information indicating to evaluate the event triggering criteria by using the second measurement result is set to the parameter. For example, when the information indicating to evaluate the event triggering criteria by using the second measurement result is set to the parameter, the terminal device performs the second measurement and evaluates the event triggering criteria by using the second measurement result. Note that, the parameter may be used in common with a parameter for specifying a type of the measurement result to be reported (report Meas Type).

In the event triggering criteria using two or more measurement results for one conditional expression, for example, when comparing a measurement result of a serving cell to the measurement result of a neighbour cell, the type of the measurement result utilized for evaluating the event triggering criteria may be specified for each of them. For example, a new parameter used for the measurement result of the serving cell (trigger Meas TypeServ) and a new parameter used for the measurement result of the neighbour cell (trigger Meas TypeNeigh) may be prescribed.

One example of a method for specifying the type of the measurement result utilized for evaluating the event triggering criteria will be described below.

By the report configuration, the type of the measurement result utilized for evaluating the event triggering criteria is specified depending on the condition for specifying the measurement.

As one specific example, the type of the measurement result utilized for evaluating the event triggering criteria is determined depending on a start-up/stop state of a target cell. For example, when the target cell is in the start-up state, the event triggering criteria are evaluated by using the first measurement result, and when the target cell is in the stop state, the event triggering criteria are evaluated by using the second measurement result.

As one specific example, the type of the measurement result utilized for evaluating the event triggering criteria is determined depending on detection of reference signals. For example, when the CRS is detected and the DRS is not detected, the event triggering criteria are evaluated by using the first measurement result, and when the CRS is not detected and the DRS is detected, the event triggering criteria are evaluated by using the second measurement result. When both of the CRS and the DRS are detected, the event triggering criteria are evaluated by using the measurement result having higher receive power. When neither the CRS nor the DRS is detected, the event triggering criteria are not evaluated.

In each example of the event and the event triggering criteria described below, both of the first measurement result and the second measurement result are used.

One example of the event will be described.

The event is triggered when a measurement result of a serving cell is better than a threshold. When satisfying a condition C1-1 and a condition C1-1', the terminal device performs transmission of a measurement report thereof. When satisfying a condition C1-2 and a condition C1-2', the terminal device stops the transmission of the measurement report.

$Ms-Hys>$Threshold　　Entering condition C1-1:

$Ms+Hys<$Threshold　　Leaving condition C1-2:

$Ms'-Hys'>$Threshold'　　Entering condition C1-1':

$Ms'+Hys'<$Threshold'　　Leaving condition C1-2':

Here, Ms denotes the first measurement result for the serving cell (a measurement offset value specific to the cell is not considered), Ms' denotes the second measurement result for the serving cell (a measurement offset value specific to the cell is not considered), Hys denotes a hysteresis parameter for the first measurement result with respect to the target event, Hys' denotes a hysteresis parameter for the second measurement result with respect to the target event, Threshold denotes a threshold parameter utilized for the first measurement result with respect to the target event, and Threshold' denotes a threshold parameter utilized for the second measurement result with respect to the target event.

One example of the event will be described.

The event is triggered when a measurement result of a serving cell is worse than a threshold. When satisfying a condition C2-1 and a condition C2-1', the terminal device performs transmission of a measurement report thereof. When satisfying a condition C2-2 and a condition C2-2', the terminal device stops the transmission of the measurement report.

$Ms-Hys<$Threshold　　Entering condition C2-1:

$Ms+Hys>$Threshold　　Leaving condition C2-2:

$Ms'-Hys'<$Threshold'　　Entering condition C2-1':

$Ms'+Hys'>$Threshold'　　Leaving condition C2-2':

Here, Ms denotes the first measurement result for the serving cell (a measurement offset value specific to the cell is not considered), Ms' denotes the second measurement result for the serving cell (a measurement offset value specific to the cell is not considered), Hys denotes a hysteresis parameter for the first measurement result with respect to the target event, Hys' denotes a hysteresis parameter for the second measurement result with respect to the target event, Threshold denotes a threshold parameter utilized for the first measurement result with respect to the target event, and Threshold' denotes a threshold parameter utilized for the second measurement result with respect to the target event.

One example of the event will be described.

The event is triggered when a measurement result of a neighbour cell is better than a measurement result of a primary cell. When satisfying a condition C3-1 and a condition C3-1', the terminal device performs transmission of a measurement report thereof. When satisfying a condition C3-2 and a condition C3-2', the terminal device stops the transmission of the measurement report.

$Mn+Ofn+Ocn-Hys>Mp+Ofp+Ocp+Off$　　Entering condition C3-1:

$Mn+Ofn+Ocn+Hys<Mp+Ofp+Ocp+Off$　　Leaving condition C3-2:

$Mn'+Ofn'+Ocn'-Hys'>Mp'+Ofp'+Ocp'+Off'$ Entering condition C3-1':

$Mn'+Ofn'+Ocn'+Hys'<Mp'+Ofp'+Ocp'+Off'$ Leaving condition C3-2':

Here, Mn denotes the first measurement result for the neighbour cell (a measurement offset value specific to the cell is not considered), Mn' denotes the second measurement result for the neighbour cell (a measurement offset value specific to the cell is not considered), Ofn denotes a frequency-specific measurement offset value for the first measurement result with respect to a frequency of the neighbour cell, Ofn' denotes a frequency-specific measurement offset value for the second measurement result with respect to a frequency of the neighbour cell, Ocn denotes a cell-specific measurement offset value for the first measurement result with respect to the neighbour cell (0 is set when not configured to the neighbour cell), Ocn' denotes a cell-specific measurement offset value for the second measurement result with respect to the neighbour cell (0 is set when not configured to the neighbour cell), Mp denotes the first measurement result for the primary cell (a measurement offset value specific to the cell is not considered), Mp' denotes the second measurement result for the primary cell (a measurement offset value specific to the cell is not considered), Ofp denotes a frequency-specific measurement offset value for the first measurement result with respect to a frequency of the primary cell, Ofp' denotes a frequency-specific measurement offset value for the second measurement result with respect to a frequency of the primary cell, Ocp denotes a cell-specific measurement offset value for the first measurement result with respect to the primary cell (0 is set when not configured to the primary cell), Ocp' denotes a cell-specific measurement offset value for the second measurement result with respect to the primary cell (0 is set when not configured to the primary cell), Hys denotes a hysteresis parameter for the first measurement result with respect to the target event, Hys' denotes a hysteresis parameter for the second measurement result with respect to the target event, Off denotes an offset parameter utilized for the first measurement result with respect to the target event, and Off' denotes an offset parameter utilized for the second measurement result with respect to the target event.

One example of the event will be described.

The event is triggered when a measurement result of a neighbour cell is better than a threshold. When satisfying a condition C4-1 and a condition C4-1', the terminal device performs transmission of a measurement report thereof. When satisfying a condition C4-2 and a condition C4-2', the terminal device stops the transmission of the measurement report.

$Mn+Ofn+Ocn-Hys>$Threshold　　Entering condition C4-1:

$Mn+Ofn+Ocn+Hys<$Threshold　　Leaving condition C4-2:

$Mn'+Ofn'+Ocn'-Hys'>$Threshold'　　Entering condition C4-1':

$Mn'+Ofn'+Ocn'+Hys'<$Threshold'　　Leaving condition C4-2':

Here, Mn denotes the first measurement result for the neighbour cell (a measurement offset value specific to the cell is not considered), Mn' denotes the second measurement result for the neighbour cell (a measurement offset value specific to the cell is not considered), Ofn denotes a frequency-specific measurement offset value for the first measurement result with respect to a frequency of the neighbour cell, Ofn' denotes a frequency-specific measurement offset value for the second measurement result with respect to a frequency of the neighbour cell, Ocn' denotes a cell-specific measurement offset value for the first measurement result with respect to the neighbour cell (0 is set when not configured to the neighbour cell), Ocn' denotes a cell-specific measurement offset value for the second measurement result with respect to the neighbour cell (0 is set when not configured to the neighbour cell), Hys denotes a hysteresis parameter for the first measurement result with respect to the target event, Hys' denotes a hysteresis parameter for the second measurement result with respect to the target event, Threshold denotes a threshold parameter utilized for the first measurement result with respect to the target event, and Threshold denotes a threshold parameter utilized for the second measurement result with respect to the target event.

One example of the event will be described.

The event is triggered when a measurement result of a primary cell is worse than a threshold 1 and a measurement result of a neighbour cell is better than a threshold 2. When satisfying a condition C5-1, a condition C5-2, a condition C5-1', and a condition C5-2', the terminal device performs transmission of a measurement report thereof. When satisfying a condition C5-3, a condition C5-4, a condition C5-3', and a condition C5-4', the terminal device stops the transmission of the measurement report.

| | |
|---|---|
| $Mp-Hys<\text{Threshold 1}$ | Entering condition C5-1: |
| $Mn+Ofn+Ocn-Hys>\text{Threshold 2}$ | Entering condition C5-2: |
| $Mp+Hys>\text{Threshold 1}$ | Leaving condition C5-3: |
| $Mn+Ofn+Ocn+Hys>\text{Threshold 2}$ | Leaving condition C5-4: |
| $Mp'-Hys'<\text{Threshold 1'}$ | Entering condition C5-1': |
| $Mn'+Ofn'+Ocn'-Hys'>\text{Threshold 2'}$ | Entering condition C5-2': |
| $Mp'+Hys'>\text{Threshold 1'}$ | Leaving condition C5-3': |
| $Mn'+Ofn'+Ocn'+Hys'<\text{Threshold 2'}$ | Leaving condition C5-4': |

Here, Mp denotes the first measurement result for the primary cell (a measurement offset value specific to the cell is not considered), Mp' denotes the second measurement result for the primary cell (a measurement offset value specific to the cell is not considered), Mn denotes the first measurement result for the neighbour cell (a measurement offset value specific to the cell is not considered), Mn' denotes the second measurement result for the neighbour cell (a measurement offset value specific to the cell is not considered), Ofn denotes a frequency-specific measurement offset value for the first measurement result with respect to a frequency of the neighbour cell, Ofn' denotes a frequency-specific measurement offset value for the second measurement result with respect to a frequency of the neighbour cell, Ocn denotes a cell-specific measurement offset value for the first measurement result with respect to the neighbour cell (0 is set when not configured to the neighbour cell), Ocn' denotes a cell-specific measurement offset value for the second measurement result with respect to the neighbour cell (0 is set when not configured to the neighbour cell), Hys denotes a hysteresis parameter for the first measurement result with respect to the target event, Hys' denotes a hysteresis parameter for the second measurement result with respect to the target event, each of Threshold 1 and Threshold 2 denotes a threshold parameter utilized for the first measurement result with respect to the target event, and each of Threshold 1' and Threshold 2' denotes a threshold parameter utilized for the second measurement result with respect to the target event.

One example of the event will be described.

The event is triggered when a measurement result of a secondary cell is better than a measurement result of a neighbour cell. When satisfying a condition C6-1 and a condition C6-1', the terminal device performs transmission of a measurement report thereof. When satisfying a condition C6-2 and a condition C6-2', the terminal device stops the transmission of the measurement report. Note that, the neighbour cell is a cell on the same frequency as that of the secondary cell.

| | |
|---|---|
| $Mn+Ocn-Hys>Ms+Ocs+Off$ | Entering condition C6-1: |
| $Mn+Ocn+Hys<Ms+Ocs+Off$ | Leaving condition C6-2: |
| $Mn'+Ocn'-Hys'>Ms'+Ocs'+Off'$ | Entering condition C6-1': |
| $Mn'+Ocn'+Hys'<Ms'+Ocs'+Off'$ | Leaving condition C6-2': |

Here, Mn denotes the first measurement result for the neighbour cell (a measurement offset value specific to the cell is not considered), Mn' denotes the second measurement result for the neighbour cell (a measurement offset value specific to the cell is not considered), Ocn denotes a cell-specific measurement offset value for the first measurement result with respect to the neighbour cell (0 is set when not configured to the neighbour cell), Ocn' denotes a cell-specific measurement offset value for the second measurement result with respect to the neighbour cell (0 is set when not configured to the neighbour cell), Ms denotes the first measurement result for the serving cell (a measurement offset value specific to the cell is not considered), Ms' denotes the second measurement result for the serving cell (a measurement offset value specific to the cell is not considered), Ocs denotes a cell-specific measurement offset value for the first measurement result with respect to the serving cell (0 is set when not configured to the serving cell), Ocs' denotes a cell-specific measurement offset value for the second measurement result with respect to the serving cell (0 is set when not configured to the serving cell), Hys denotes a hysteresis parameter for the first measurement result with respect to the target event, Hys' denotes a hysteresis parameter for the second measurement result with respect to the target event, Off denotes an offset parameter utilized for the first measurement result with respect to the target event, and Off' denotes an offset parameter utilized for the second measurement result with respect to the target event.

Next, details of a measurement result will be described.

This measurement result is constituted by a measurement identity (meas Id), a serving cell measurement result (meas Resultserving), and an EUTRA measurement result list (meas Result List EUTRA). The EUTRA measurement result list (meas Result List EUTRA) includes a physical cell identity (physical Cell Identity) and a EUTRA cell measurement result (meas Result EUTRA). The measurement identity (meas Id) is an identify utilized for linking the measurement object identity (meas Object Id) and the reporting configuration identity (report Config Id) as described above.

The physical cell identity (physical Cell Identity) is utilized for identifying a cell. The EUTRA cell measurement result (meas Result EUTRA) is a measurement result for an EUTRA cell. The measurement result of a neighbour cell is included only when a relevant event is generated.

One example of the measurement result will be described.

With the measurement result, both results of the RSRP and the RSRQ for the target cell are reported. The RSRP and the RSRQ reported at one time are any one of the first measurement result or the second measurement result.

As one specific example, the measurement result is reported based on a parameter for determining whether to be the first measurement result or the second measurement result. A reference for determining whether to be the first measurement result or the second measurement result is, for example, a new parameter (report Meas Type). Information indicating to report the first measurement result or information indicating to report the second measurement result is set to the parameter. For example, when the information indicating to report the second measurement result is set to the parameter, the terminal device recognizes the parameter, performs the second measurement, transmits the second measurement result on a measurement report message, and does not transmit the first measurement result.

Note that, the parameter may be used in common with a parameter for specifying the type of the measurement result utilized for evaluating the event triggering criteria (trigger Meas Type). Note that, the parameter may be used in common with a higher-layer parameter for specifying a measurement method.

Note that, the parameter (report Quantity) may be configured for each type of the measurement as a parameter for the RSRP (report Quantity RSRP) and a parameter for the RSRQ (report Quantity RSRQ). For example, when the report Quantity RSRP is configured as the first RSRP and the report Quantity RSRQ is configured as the second RSRQ, the terminal device transmits the first RSRP and the second RSRQ and does not transmit the second RSRP and the first RSRQ.

As one specific example, when periodic report or event triggered periodic report is configured, the first measurement result and the second measurement result are periodically and alternatively reported to the terminal device. For example, the first measurement result is reported in the first report, the second measurement result is reported in the second report, the first measurement result is reported in the third report, the second measurement result is reported in the fourth report, and then, the report is repeatedly and alternately performed.

Note that, the first measurement result and the second measurement result may not be reported at the same frequency. For example, a cycle at which the first measurement result is reported twice and then the second measurement result is reported once may be configured. Specifically, the first measurement result is reported in the first report and the second report and the second measurement result is reported in the third report. The number of times of the report is configured by a parameter of a higher layer.

As one specific example, the report is performed depending on the condition for specifying the measurement.

For example, a type of the measurement result to be reported is determined depending on the start-up/stop state of a target cell.

For example, the type of the measurement result to be reported is determined depending on detection of reference signals. For example, when the CRS is detected and the DRS is not detected, the first measurement result is reported, and when the CRS is not detected and the DRS is detected, the second measurement result is reported. When both of the CRS and the DRS are detected, the measurement result having higher receive power is reported. When neither the CRS nor the DRS is detected, no report is performed or a minimum value is reported.

Note that, a parameter which clearly indicates which type of the measurement is set may be added to the measurement result so that the terminal device causes the base station device to recognize whether the reported measurement result is the result calculated by the first measurement or the result calculated by the second measurement.

One example of the report of the measurement result will be described.

With the measurement result, results of the first RSRP and the first RSRQ as well as the second RSRP and the second RSRQ for the target cell are reported.

The terminal device performs the first measurement and the second measurement, and transmits (transfers) the measurement result on a measurement report message.

When the CRS is not able to be detected, the terminal device performs the report by setting a minimum value to the first measurement result. When the CRS is not able to be detected, the terminal device does not need to report the first measurement result.

When the DRS is not able to be detected, the terminal device performs the report by setting a minimum value to the second measurement result. When the DRS is not able to be detected, the terminal device does not need to report the second measurement result.

One example of the report of the measurement result will be described.

With the measurement result, results of the RSRP and the RSRQ for the target cell and inter-cell interference measurement are reported. Examples of the result of the inter-cell interference measurement include receive power, the SINR, and the RSSI measured in an interference measurement resource.

The terminal device recognizes the parameter, performs the measurement and an inter-cell interference quantity, and transmits the measurement results on a measurement report message.

Each example of the event, the event triggering criteria, and the report of the measurement result has been described above. With a combination thereof, the terminal device reports the first measurement result and/or the second measurement result to the base station device. In the present embodiment, though there is no limitation to the combination of the event, the event triggering criteria, and the report of the measurement result, one example of a preferable combination will be described below.

One example of the combination of the event, the event triggering criteria, and the report of the measurement result will be described.

When the first measurement is performed, a measurement object (meas Object) that includes a neighbour cell list or a black list to which a physical cell identity is configured is configured, a report configuration (report Config) for configuring the event triggered by the first measurement and the event triggering criteria is configured, and they are associated with each other by the ID so that a measurement report message including the first measurement result (meas Results) is transmitted. Further, when the second measurement is performed, a measurement object (meas Object) that includes a new neighbour cell list or a new black list to which an extended cell ID is configured is configured, a report configuration (report Config) for configuring the event triggered by the second measurement and the event triggering criteria is configured, and they are associated with each other by the ID so that a measurement report message including the second measurement result (meas Results) is transmitted.

That is, the measurement object, the report configuration, and the measurement result for the first measurement and the measurement object, the report configuration, and the measurement result for the second measurement are configured to the terminal device. That is, the report configuration of the first measurement result and the report configuration of a second measurement result are configured individually.

One example of the combination of the event, the event triggering criteria, and the report of the measurement result will be described.

When the first measurement is performed, a measurement object (meas Object) that includes a neighbour cell list or a black list to which a physical cell identity is configured is configured, a report configuration (report Config) for configuring the event triggered by the first measurement and the event triggering criteria is configured, and they are associated with each other by the measurement results (meas Results) and the ID. Further, when the second measurement is performed, a measurement object (meas Object) that includes a new neighbour cell list or a new black list to which an extended cell ID is configured is configured, a report configuration (report Config) for configuring the event triggered by the second measurement and the event triggering criteria is configured, and they are associated with each other by the measurement results (meas Results) and the ID. When the event triggered by the first measurement is generated, the first measurement result is substituted in the measurement result and the transmission by the measurement report message is performed. When the event triggered by the second measurement is generated, the second measurement result is substituted in the measurement result and the transmission by the measurement report message is performed.

That is, the measurement object and the report configuration for the first measurement and the measurement object and the report configuration for the second measurement are configured, and fields of the measurement results are shared between the first measurement and the second measurement. The first measurement result or the second measurement result is transmitted by the event.

Thereby, the terminal device is able to report the first measurement result and the second measurement result to the base station device.

The terminal device of the present embodiment is a terminal device communicating with a base station device, including: a reception unit which performs first measurement based on a first RS (CRS) and performs second measurement based on a second RS (DRS); and a higher layer processing unit which reports a result of the first measurement and a result of the second measurement to the base station device, in which the result of the first measurement is reported to the base station device in a first state and the result of the first measurement or the result of the second measurement is reported to the base station device in a second state.

As one example, an event by which the first measurement result is reported and an event by which the second measurement result is reported are configured by the base station device in the second state. Further, as one example, only an event by which the second measurement result is reported is configured by the base station device in the second state.

Event triggering criteria for reporting the second measurement result are prescribed by using the result of the second measurement result.

As one example, the first state is a state where configuration information on the second RS is not notified and the second state is a state where the configuration information on the second RS is notified from the base station device. Further, as one example, the first state is a state where the second measurement information is not configured and the second state is a state where the second measurement information is configured from the base station device. In addition, as one example, the second state is a state where the first RS is not transmitted.

Values of transmit power of the PUSCH and PHR (Power Headroom) are determined depending on path loss. One example of a method for estimating path loss (channel attenuation value) will be described below.

An estimated value of downlink path loss of a serving cell c is calculated by the terminal device with use of a formula of PLc=reference Signal Power−higher layer filtered RSRP. In the formula, the reference Signal Power is provided by a higher layer. The reference Signal Power is information based on transmit power of the CRS. In the formula, the higher layer filtered RSRP is the first RSRP of a reference serving cell filtered in the higher layer.

When the serving cell c belongs to TAG including a primary cell, with respect to an uplink primary cell, the primary cell is used for reference serving cells of the reference Signal Power and the higher layer filtered RSRP. With respect to an uplink secondary cell, a serving cell configured by the pathloss Reference Linking as a higher layer parameter is used for the reference serving cell of the reference Signal Power and the higher layer filtered RSRP. When the serving cell c belongs to TAG not including a primary cell, the serving cell c is used for the reference serving cell of the reference Signal Power and the higher layer filtered RSRP.

One example of a method for estimating path loss will be described.

An estimated value of downlink path loss of the serving cell c is calculated by the terminal device with use of a formula of PLc=discovery Reference Signal Power−higher layer filtered RSRP2 in a case of being configured by the higher layer and with use of a formula of PLc=reference Signal Power−higher layer filtered RSRP in a case of not being configured by the higher layer. In the formula, the reference Signal Power is provided by the higher layer. The reference Signal Power is information based on transmit power of the CRS. In the formula, the higher layer filtered RSRP is the first RSRP of a reference serving cell filtered in the higher layer. In the formula, the discovery Reference Signal Power is provided by the higher layer. The discovery Reference Signal Power is information based on transmit power of the DRS. In the formula, the higher layer filtered RSRP is the second RSRP of a reference serving cell filtered in the higher layer.

The case of being configured by the higher layer is based on, for example, a configuration of the DRS. The case of being configured by the higher layer is based on, for example, a configuration of the measurement. The case of being configured by the higher layer is based on, for example, a configuration of control of uplink transmit power.

When the serving cell c belongs to TAG including a primary cell, with respect to an uplink primary cell, the primary cell is used for reference serving cells of the discovery Reference Signal Power and the higher layer filtered RSRP2. With respect to an uplink secondary cell, a serving cell configured by the pathloss Reference Linking as a higher layer parameter is used for the reference serving cell of the discovery Reference Signal Power and the higher layer filtered RSRP2. When the serving cell c belongs to TAG not including a primary cell, the serving cell c is used for the reference serving cell of the discovery Reference Signal Power and the higher layer filtered RSRP2.

One example of a method for estimating path loss will be described.

An estimated value of downlink path loss of a primary cell is calculated by the terminal device with use of a formula of PLc=reference Signal Power−higher layer filtered RSRP. The calculation is performed with a formula of PLc=discovery Reference Signal Power−higher layer filtered RSRP2 in a case where the serving cell c is in the stop state and with use of a formula of PLc=reference Signal Power−higher layer filtered RSRP in a case where the serving cell c is in the start-up state. In the formula, the reference Signal Power is provided by the higher layer. The reference Signal Power is information based on transmit power of the CRS. In the formula, the higher layer filtered RSRP is the first RSRP of a reference serving cell filtered in the higher layer. In the formula, the discovery Reference Signal Power is provided by the higher layer. The discovery Reference Signal Power is information based on transmit power of the DRS. In the formula, the higher layer filtered RSRP2 is the second RSRP of a reference serving cell filtered in the higher layer.

The threshold to be compared to the second RSRP is configured by the higher layer.

When the serving cell c belongs to TAG including a primary cell, with respect to an uplink primary cell, the primary cell is used for reference serving cells of the reference Signal Power, the discovery Reference Signal Power, the higher layer filtered RSRP, and the higher layer filtered RSRP2. With respect to an uplink secondary cell, a serving cell configured by the pathloss Reference Linking as a higher layer parameter is used for the reference serving cell of the reference Signal Power, the discovery Reference Signal Power, the higher layer filtered RSRP, and the higher layer filtered RSRP2. When the serving cell c belongs to TAG not including a primary cell, the serving cell c is used for the reference serving cell of the reference Signal Power, the discovery Reference Signal Power, the higher layer filtered RSRP, and the higher layer filtered RSRP2.

One example of a method for estimating path loss will be described.

An estimated value of downlink path loss of a primary cell is calculated by the terminal device with use of a formula of PLc=reference Signal Power−higher layer filtered RSRP. An estimated value of downlink path loss of the serving cell c is calculated by the terminal device with a formula of PLc=discovery Reference Signal Power−higher layer filtered RSRP2 in a case where the serving cell c does not belong to TAG including a primary cell and the second RSRP is equal to or more than the threshold and with use of a formula of PLc=reference Signal Power−higher layer filtered RSRP otherwise. In the formula, the reference Signal Power is provided by the higher layer. The reference Signal Power is information based on transmit power of the CRS. In the formula, the higher layer filtered RSRP is the first RSRP of a reference serving cell filtered in the higher layer. In the formula, the discovery Reference Signal Power is provided by the higher layer. The discovery Reference Signal Power is information based on transmit power of the DRS. In the formula, the higher layer filtered RSRP2 is the second RSRP of a reference serving cell filtered in the higher layer.

The threshold to be compared to the second RSRP is configured by the higher layer.

When the serving cell c belongs to TAG including a primary cell, with respect to an uplink primary cell, the primary cell is used for reference serving cells of the reference Signal Power and the higher layer filtered RSRP. With respect to an uplink secondary cell, a serving cell configured by the pathloss Reference Linking as a higher layer parameter is used for the reference serving cell of the reference Signal Power, the discovery Reference Signal Power, the higher layer filtered RSRP, and the higher layer filtered RSRP2. When the serving cell c belongs to TAG not including a primary cell, the serving cell c is used for the reference serving cell of the reference Signal Power, the discovery Reference Signal Power, the higher layer filtered RSRP, and the higher layer filtered RSRP2.

Control of downlink power will be described below.

The control of downlink power is determined by EPRE (Energy Per Resource Element). In this case, the energy per resource element is energy before CP (Cyclic Prefix) is inserted. The energy per resource element is average energy taking over all constellation points with respect to an applied modulation method.

The terminal device assumes the EPRE of a downlink cell-specific reference signal, which is fixed over all subframes and is fixed over a downlink system bandwidth until information on reference signal power specific to a different cell is received. The EPRE of the downlink cell-specific reference signal is calculated from downlink reference signal transmit power provided by a parameter (reference Signal Power) provided by the higher layer. The downlink reference signal transmit power is defined to be obtained by linearly averaging power of all resource elements carrying the cell-specific reference signal included in the operating system bandwidth.

The terminal device assumes downlink positioning reference signal EPRE which is fixed over all OFDM symbols including a positioning reference signal of a predetermined positioning reference signal being generated and fixed over the bandwidth of the positioning reference signal.

When the CSI-RS is configured in a serving cell, the terminal device assumes the downlink CSI-RS EPRE which is fixed over all subframes with respect to each CSI-RS resource and fixed over the downlink system bandwidth.

When the DRS is configured in a predetermined cell, the terminal device assumes the downlink DRS EPRE which is fixed over all subframes with respect to each DRS resource and fixed over the downlink system bandwidth.

Details of a method for notifying the terminal device of transmit power of the PDSCH will be described below. Details of a method for performing notification based on transmit power of the CRS will be described below.

Ratios of the PDSCH EPRE of the resource element of the PDSCH to each OFDM symbol to the cell-specific RS EPRE are represented by $\rho_A$ and $\rho_B$. Here, $\rho_A$ indicates a ratio of the PDSCH EPRE of the OFDM symbol not including the CRS to the cell-specific RS EPRE. Here, $\rho_B$ indicates a ratio the PDSCH EPRE of the OFDM symbol including the CRS to the cell-specific RS EPRE. Additionally, $\rho_A$ and $\rho_B$ are specific to a terminal.

In a terminal device in a transmission mode 8-10 or a terminal device in a transmission mode 1-7 in each of which a terminal-specific RS does not exist in a PRB having the associated PDSCH arranged, the terminal device is assumed to have the following $\rho_A$ with respect to spatial multiplexing or PDSCH transmission associated with a multi-user MIMO transmission method, which is greater than that of the 16QAM, 64QAM, or 1 layer. Note that, the similar assumption may be applied also to 256QAM.

In a case where the terminal device receives transmission of PDSCH data using precoding of transmission diversity by four cell-specific antenna ports, $\rho_A$ is equal to $\delta_{power-offset}+P_A+10\log_{10}(2)$, and $\rho_A$ is equal to $\delta_{power-offset}+P_A$ in other cases. The $\delta_{power-offset}$ is 0 dB in all PDSCH transmission methods other than multi-user MIMO, and $P_A$ is a parameter which is provided by the higher layer and specific to the terminal device.

A cell-specific ratio $\rho_A/\rho_B$ is determined by $P_B$ and the number of antenna ports of the CRS. Here, $P_B$ denotes a cell-specific parameter notified by the higher layer.

Details of a method for notifying the terminal device of transmit power of the PDSCH will be described below. Details of a method for performing notification based on transmit power of the DRS will be described below.

Ratios of the PDSCH EPRE of the resource element of the PDSCH to each OFDM symbol to the DRS EPRE are represented by $\rho_A'$ and $\rho_B'$. Here, $\rho_A'$ indicates a ratio of the PDSCH EPRE of the OFDM symbol not including the CRS to the DRS EPRE. Here, $\rho_B'$ indicates a ratio the PDSCH EPRE of the OFDM symbol including the CRS to the DRS EPRE. Additionally, $\rho_A'$ and $\rho_B'$ are specific to a terminal.

In a terminal device in a transmission mode 8-10 or a terminal device in a transmission mode 1-7 in each of which a terminal-specific RS does not exist in a PRE having the associated PDSCH arranged, the terminal device is assumed to have the following $\rho_A'$ with respect to spatial multiplexing or PDSCH transmission associated with a multi-user MIMO transmission method, which is greater than that of the 16QAM, 64QAM, or 1 layer. Note that, the similar assumption may be applied also to 256QAM.

In a case where the terminal device receives transmission of PDSCH data using precoding of transmission diversity by four cell-specific antenna ports, $\rho_A'$ is equal to $\delta_{power-offset}+P_A'+10\log_{10}(2)$, and $\rho_A$ is equal to $\delta_{power-offset}+P_A'$ in other cases. The $\delta_{power-offset}$ is 0 dB in all PDSCH transmission methods other than multi-user MIMO, and $P_A'$ is a parameter which is provided by the higher layer and specific to the terminal device.

A ratio $\rho_A'/\rho_B'$ is determined based on $P_B'$. Here, $P_B'$ denotes a parameter notified by the higher layer.

With the details of the aforementioned embodiments, it is possible to improve transmission efficiency in a radio communication system in which a base station device communicates with a terminal device.

A program which runs in the base station device 3 and the terminal device 1 concerning the invention may be a program that controls a CPU (Central Processing Unit) and the like (program that causes a computer to function) such that the functions in the aforementioned embodiments concerning the invention are realized. The pieces of information handled by the devices are temporarily accumulated in a RAM (Random Access Memory) during the processing thereof, and then stored in various ROMs such as a flash ROM and HDDs (Hard Disk Drives) and read, corrected, and written by the CPU when necessary.

A part of the terminal device 1 and the base station device 3 in the aforementioned embodiments may be realized by a computer. In such a case, a program to realize this control function may be recorded in a computer-readable recording medium, and a computer system may be caused to read and execute the program recorded in the recording medium and, thereby, the control function may be realized.

Note that, the "computer system" used herein refers to a computer system that is incorporated in the terminal device 1 or the base station device 3 and that includes an OS and hardware such as a peripheral device. The "computer-readable recording medium" refers to a portable medium such as a flexible disk, a magneto-optical disk, a ROM, or a CD-ROM, or a storage device such as a hard disk incorporated in the computer system.

Further, the "computer-readable recording medium" may include one that dynamically retains the program for a short time period such as a communication cable used when the program is transmitted through a network such as the Internet or a communication line such as a telephone line and, in such a case, one that retains the program for a fixed time period such as a volatile memory in a computer system used as a server or a client. The "program" may be one to realize a part of the functions described above, or may also be one that is able to realize the part in combination with the program already recorded in the computer system.

Furthermore, the base station device 3 according to the aforementioned embodiments can be realized as an aggregation (a device group) that is configured from multiple devices. Each device that constitutes the device group may be provided with a part or all of each function or each functional block of the base station device 3 according to the aforementioned embodiments. The device group may have each general function or each general functional block of the base station device 3. Furthermore, the terminal device 1 according to the embodiment described above can also communicate with the base station device as the aggregation.

The base station device 3 in the aforementioned embodiment may be EUTRAN (Evolved Universal Terrestrial Radio Access Network). The base station device 3 in the aforementioned embodiments may have a part or all of functions of a higher node to eNodeB.

A part or all of the terminal device 1 and the base station device 3 in the aforementioned embodiments may be realized as an LSI which is a typical integrated circuit. Each functional block of the terminal device 1 and the base station device 3 may be individually formed into a chip, or a part or all thereof may be integrated and formed into a chip. Further, a method for making into an integrated circuit is not limited to the LSI and a dedicated circuit or a versatile processor may be used for realization. Further, in a case where a technique for making into an integrated circuit in place of the LSI appears with advance of a semiconductor technique, an integrated circuit by the technique is also able to be used.

Note that, though a terminal device has been described as one example of a terminal device or a communication device in the aforementioned embodiments, the invention of the present application is not limited thereto and is applicable to stationary or unmovable electronic equipment which is installed indoors or outdoors such as, for example, a terminal device or a communication device including AV equipment, kitchen equipment, cleaning/washing machine, air conditioning equipment, office equipment, automatic vending machine, other domestic equipment, and the like.

As above, the embodiments of the invention have been described in detail with reference to drawings, but specific configurations are not limited to the embodiments, and a design and the like which are not departed from the main subject of the invention are also included. The invention may be modified in various manners within the scope of the claims and an embodiment achieved by appropriately combining technical means disclosed in each of different embodiments is also encompassed in the technical scope of the invention. In addition, configurations obtained by replacing elements that have been described in the embodiments described above and that exert similar effects are also included.

INDUSTRIAL APPLICABILITY

The invention is able to be used for a base station device, a terminal device, a communication system, a communication method, an integrated circuit, and the like.

REFERENCE SIGNS LIST 1 (1A, 1B, 1C) terminal device
3 base station device
101 higher layer processing unit
103 control unit
105 reception unit
107 transmission unit
301 higher layer processing unit
303 control unit
305 reception unit
307 transmission unit
1011 radio resource control unit
1013 subframe configuration unit
1015 scheduling information interpretation unit
1017 CSI report control unit
3011 radio resource control unit
3013 subframe configuration unit
3015 scheduling unit
3017 CSI report control unit
1301 measurement unit
13011 layer 1 filtering unit
13012 layer 3 filtering unit
13013 report reference evaluation unit

The invention claimed is:

1. A terminal device, comprising:
reception circuitry which receives information applicable for measurement of discovery signals, wherein
in a case that the information includes first information associated with a physical cell identity, second information associated with another type of identity different from the physical cell identity, third information associated with a configuration of a subframe, and fourth information associated with a configuration of a resource,
a pseudo-random sequence of the discovery signals is configured based on the second information, and
the pseudo-random sequence of the discovery signals being configurable such that the pseudo-random sequence is different from a pseudo-random sequence of channel state information reference signals.

2. The terminal device according to claim 1, wherein
the pseudo-random sequence of the discovery signals is generated based on the first information in a case that the second information is not included in the information, and
the pseudo-random sequence of the discovery signals is generated based on the second information in a case that the second information is included in the information.

3. The terminal device according to claim 1, wherein
the fourth information is an index for indicating resource elements of the discovery signals.

4. A base station device, comprising:
generating circuitry which generates information applicable for measurement of discovery signals; and
transmission circuitry which transmits the information, wherein
in a case that the information includes first information associated with a physical cell identity, second information associated with a parameter different from the physical cell identity, third information associated with a configuration of a subframe, and fourth information associated with a configuration of a resource,
a pseudo-random sequence of the discovery signals is configured based on the second information, and
the pseudo-random sequence of the discovery signals being configurable such that the pseudo-random sequence is different from a pseudo-random sequence of channel state information reference signals.

5. The base station device according to claim 4, wherein
the pseudo-random sequence of the discovery signals is generated based on the first information in a case that the second information is not included in the information, and
the pseudo-random sequence of the discovery signals is generated based on the second information in a case that the second information is included in the information.

6. The base station device according to claim 4, wherein
the fourth information is an index for indicating resource elements of the discovery signals.

7. A communication method of a base station device, comprising:
a step of generating information applicable for measurement of discovery signals; and
a step of transmitting the information, wherein
in a case that the information includes first information associated with a physical cell identity, second information associated with a parameter different from the physical cell identity, third information associated with a configuration of a subframe, and fourth information associated with a configuration of a resource,
a pseudo-random sequence of the discovery signals is generated based on the first information or the second information, and
the pseudo-random sequence of the discovery signals being configurable such that the pseudo-random sequence is different from a pseudo-random sequence of channel state information reference signals.

* * * * *